(12) United States Patent
Chen et al.

(10) Patent No.: US 12,474,433 B2
(45) Date of Patent: Nov. 18, 2025

(54) PRESENCE DETECTION AND RECOGNITION WITH WI-FI

(71) Applicant: Samsung Electronics Co., Ltd., Suwon-si (KR)

(72) Inventors: Hao Chen, Plano, TX (US); Guanbo Chen, McKinney, TX (US); Hao-Hsuan Chang, Plano, TX (US); Dong Li, Plano, TX (US); Abhishek Sehgal, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 17/936,799

(22) Filed: Sep. 29, 2022

(65) Prior Publication Data

US 2023/0109149 A1 Apr. 6, 2023

Related U.S. Application Data

(60) Provisional application No. 63/251,933, filed on Oct. 4, 2021.

(51) Int. Cl.
*G01S 5/02* (2010.01)
*G01S 13/50* (2006.01)
*H04W 64/00* (2009.01)

(52) U.S. Cl.
CPC .......... *G01S 5/02525* (2020.05); *G01S 13/50* (2013.01); *H04W 64/006* (2013.01)

(58) Field of Classification Search
CPC ......... H04W 4/029; H04W 4/80; H04W 4/33; H04W 84/12; H04W 4/02; H04W 4/38;

(Continued)

(56) References Cited

U.S. PATENT DOCUMENTS

| 4,686,999 A | 8/1987 | Snyder et al. |
| 10,006,246 B2 | 6/2018 | Barwick et al. |

(Continued)

FOREIGN PATENT DOCUMENTS

| CN | 107994960 A | 5/2018 |
| CN | 109961100 A | 7/2019 |

(Continued)

OTHER PUBLICATIONS

International Search Report and Written Opinion issued Jan. 2, 2023 regarding International Application No. PCT/KR2022/014920, 8 pages.

(Continued)

*Primary Examiner* — Kwasi Karikari

(57) ABSTRACT

A method includes receiving CSI data for at least one communication link between a first electronic device (ED1) and a Wi-Fi device in a 3D space. The method includes preprocessing the CSI data; and determining whether a motion of an object is detected within a threshold distance to the ED1 based on the preprocessed CSI data. The detection of the motion of the object corresponds to a determination that the object is present in the space. The detection of no motion of the object corresponds to a determination that the object is not present in the space. The method includes outputting at least one of: a first indicator indicating that the space is empty, in response to the determination that the object is not present in the space; or a second indicator indicating that the space is occupied, in response to the determination that the object is present in the space.

20 Claims, 15 Drawing Sheets

(58) Field of Classification Search
CPC ... H04W 4/025; H04W 64/003; H04W 12/63; H04W 52/0251; H04W 52/0209; H04W 48/20; H04W 28/0226

See application file for complete search history.

(56) References Cited

U.S. PATENT DOCUMENTS

| | | | |
|---|---|---|---|
| 10,310,079 B1* | 6/2019 | Um | G01S 15/04 |
| 10,404,387 B1* | 9/2019 | Devison | H04B 17/309 |
| 10,531,817 B2 | 1/2020 | Zhang et al. | |
| 10,735,298 B2 | 8/2020 | Chen et al. | |
| 11,012,285 B2 | 5/2021 | Chen et al. | |
| 11,070,945 B1 | 7/2021 | Gao et al. | |
| 11,340,328 B2 | 5/2022 | Wang et al. | |
| 2016/0022145 A1 | 1/2016 | Mostov | |
| 2018/0227714 A1* | 8/2018 | Lee | H04L 67/12 |
| 2018/0365975 A1 | 12/2018 | Xu et al. | |
| 2019/0028320 A1 | 1/2019 | Xu et al. | |
| 2019/0170869 A1* | 6/2019 | Kravets | G08B 13/2491 |
| 2019/0272741 A1 | 9/2019 | MacKenzie et al. | |
| 2020/0300972 A1 | 9/2020 | Wang et al. | |
| 2020/0323034 A1 | 10/2020 | Da Silva et al. | |
| 2021/0103045 A1 | 4/2021 | Kravets et al. | |
| 2021/0186369 A1 | 6/2021 | Wei et al. | |
| 2022/0070633 A1 | 3/2022 | Ghoshal et al. | |
| 2022/0291328 A1 | 9/2022 | Ozturk et al. | |
| 2024/0073858 A1* | 2/2024 | Mahurkar | H04W 64/006 |

FOREIGN PATENT DOCUMENTS

| | | |
|---|---|---|
| CN | 110337066 A | 10/2019 |
| CN | 111568425 A | 8/2020 |
| CN | 107994960 B | 11/2020 |
| CN | 110013252 B2 | 3/2021 |
| CN | 113133758 A | 7/2021 |
| EP | 3885786 A1 | 9/2021 |
| WO | 8605965 A1 | 10/1986 |
| WO | 2017156492 A1 | 9/2017 |
| WO | 2020228324 A1 | 11/2020 |
| WO | 2021007293 A1 | 1/2021 |
| WO | 2021084519 A1 | 5/2021 |

OTHER PUBLICATIONS

Partial European Search Report issued Oct. 1, 2024 regarding Application No. 22878856.8, 15 pages.

Extended European Search Report issued Sep. 10, 2024 regarding Application No. 22878848.5, 8 pages.

Wang et al., "PhaseBeat: Exploiting CSI Phase Data for Vital Sign Monitoring with Commodity WiFi Devices", 2017 IEEE 37th International Conference on Distributed Computing Systems, Jun. 2017, pp. 1230-1239.

Zhang et al., "Unlocking the Beamforming Potential of LoRa for Long-range Multi-target Respiration Sensing", Proceedings of the ACM on Interactive, Mobile, Wearable and Ubiquitous Technologies, vol. 5, Issue 2, Article No. 85, Jun. 2021, 25 pages.

International Search Report and Written Opinion issued Jan. 17, 2023 regarding International Application No. PCT/KR2022/014901, 6 pages.

Extended European Search Report issued Jan. 16, 2025 regarding Application No. 22878856.8, 13 pages.

USPTO Office Action issued Sep. 30, 2025 regarding U.S. Appl. No. 17/936,357, 44 pages.

Liu et al., "Contactless Respiration Monitoring Via Off-the-Shelf WiFi Devices", IEEE Transactions on Mobile Computing, vol. 15, No. 10, Oct. 2016, pp. 2466-2479.

* cited by examiner

PRESENCE DETECTION AND RECOGNITION WITH WI-FI

CROSS-REFERENCE TO RELATED APPLICATION(S) AND CLAIM OF PRIORITY

This application claims priority under 35 U.S.C. § 119(e) to U.S. Provisional Patent Application No. 63/251,933 filed on Oct. 4, 4021. The above-identified provisional patent application is hereby incorporated by reference in its entirety.

TECHNICAL FIELD

This disclosure relates generally to object detection. More specifically, this disclosure relates to presence detection and recognition with wireless fidelity (Wi-Fi).

BACKGROUND

Mobile electronic devices, such as smartphones and tablet computers, have become the most prevalent device type for communicating in professional and private settings. The mobile electronic device can connect to peripheral accessories to enhance user convenience. Likewise, the mobile electronic device can connect to smart home devices to enhance user convenience.

SUMMARY

This disclosure provides presence detection and recognition with Wi-Fi.

In one embodiment, a method for presence detection and recognition with Wi-Fi is provided. The method includes receiving channel state information (CSI) data for at least one communication link between a first electronic device and a Wi-Fi device (e.g., Wi-Fi access point) in a three-dimensional (3D) space. The method includes preprocessing the CSI data to remove one or more anomaly data points and generate preprocessed CSI data. The method includes determining whether a motion of an object is detected within a threshold distance to the first electronic device based on the preprocessed CSI data. The detection of the motion of the object corresponds to a determination that the object is present in the 3D space. The detection of no motion of the object is a determination that the object is not present in the 3D space. The method includes outputting at least one of: a first indicator indicating that the 3D space is in an empty state, in response to the determination that the object is not present in the 3D space; or a second indicator indicating that the 3D space is in an occupied state, in response to the determination that the object is present in the 3D space.

In another embodiment, an electronic device for presence detection and recognition with Wi-Fi is provided. The electronic device includes a wireless communication circuit configured to operate using a Wi-Fi protocol, and a processor operably connected to the wireless communication circuit. The processor is configured to receive channel state information (CSI) data for at least one communication link between a first electronic device and a Wi-Fi device in a three-dimensional (3D) space. The processor is configured to preprocess the CSI data to remove one or more anomaly data points and generate preprocessed CSI data. The processor is configured to determine whether a motion of an object is detected within a threshold distance to the first electronic device based on the preprocessed CSI data. The detection of the motion of the object corresponds to a determination that the object is present in the 3D space. The detection of no motion of the object is a determination that the object is not present in the 3D space. The processor is configured to output at least one of: a first indicator indicating that the 3D space is in an empty state, in response to the determination that the object is not present in the 3D space; or a second indicator indicating that the 3D space is in an occupied state, in response to the determination that the object is present in the 3D space.

In yet another embodiment, a non-transitory computer readable medium comprising program code for is presence detection and recognition with Wi-Fi provided. The computer program includes computer readable program code that when executed causes at least one processor to receive channel state information (CSI) data for at least one communication link between a first electronic device and a Wi-Fi device in a three-dimensional (3D) space. The computer readable program code causes the processor to preprocess the CSI data to remove one or more anomaly data points and generate preprocessed CSI data. The computer readable program code causes the processor to determine whether a motion of an object is detected within a threshold distance to the first electronic device based on the preprocessed CSI data. The detection of the motion of the object correspond to a determination that the object is present in the 3D space. The detection of no motion of the object is a determination that the object is not present in the 3D space. The computer readable program code causes the processor to output at least one of: a first indicator indicating that the 3D space is in an empty state, in response to the determination that the object is not present in the 3D space; or a second indicator indicating that the 3D space is in an occupied state, in response to the determination that the object is present in the 3D space.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system or device.

Wi-Fi sensing is a technique to utilize a Wi-Fi chipset and signals for sensing purposes. When a Wi-Fi access point (AP) is communicating with Wi-Fi station (STA), the channel state information (CSI) reflects the environment change caused by the human moving, gesture or other activities. That is, a change in the environment causes a change in the CSI. By detecting the CSI change, the human activities can be recognized, which can be further used to control electronic devices.

According to the 802.11 specification defined Wi-Fi communication system, beacon signals will be transmitted before the data frames. Different specifications will have different format of beacons preambles. For example, in legacy preambles for 802.11a, short training frame (STF) is for signal detection, automatic gain control, coarse frequency adjustment and timing synchronization. Long training frame (LTF) is used for fine frequency adjustment and channel estimation. The estimated channel information, such as CSI, can be used for sensing purposes. The 802.11 specification also defines that access points (APs) will periodically broadcast beacons information.

This disclosure is focused on solving the problem of using Wi-Fi CSI data to detect the presence of an object (such as a human, pet, or robot) in a room. In this disclosure, "presence" and "occupancy" are used interchangeably. This disclosure provides novel methods of detecting and recognizing presence of a room. This disclosure uses the phase information of Wi-Fi signals to detect the occupancy state of a room, namely vacant or occupied. This disclosure uses the phase information of Wi-Fi signals to recognize a moving object in an occupied room.

Figure 1:
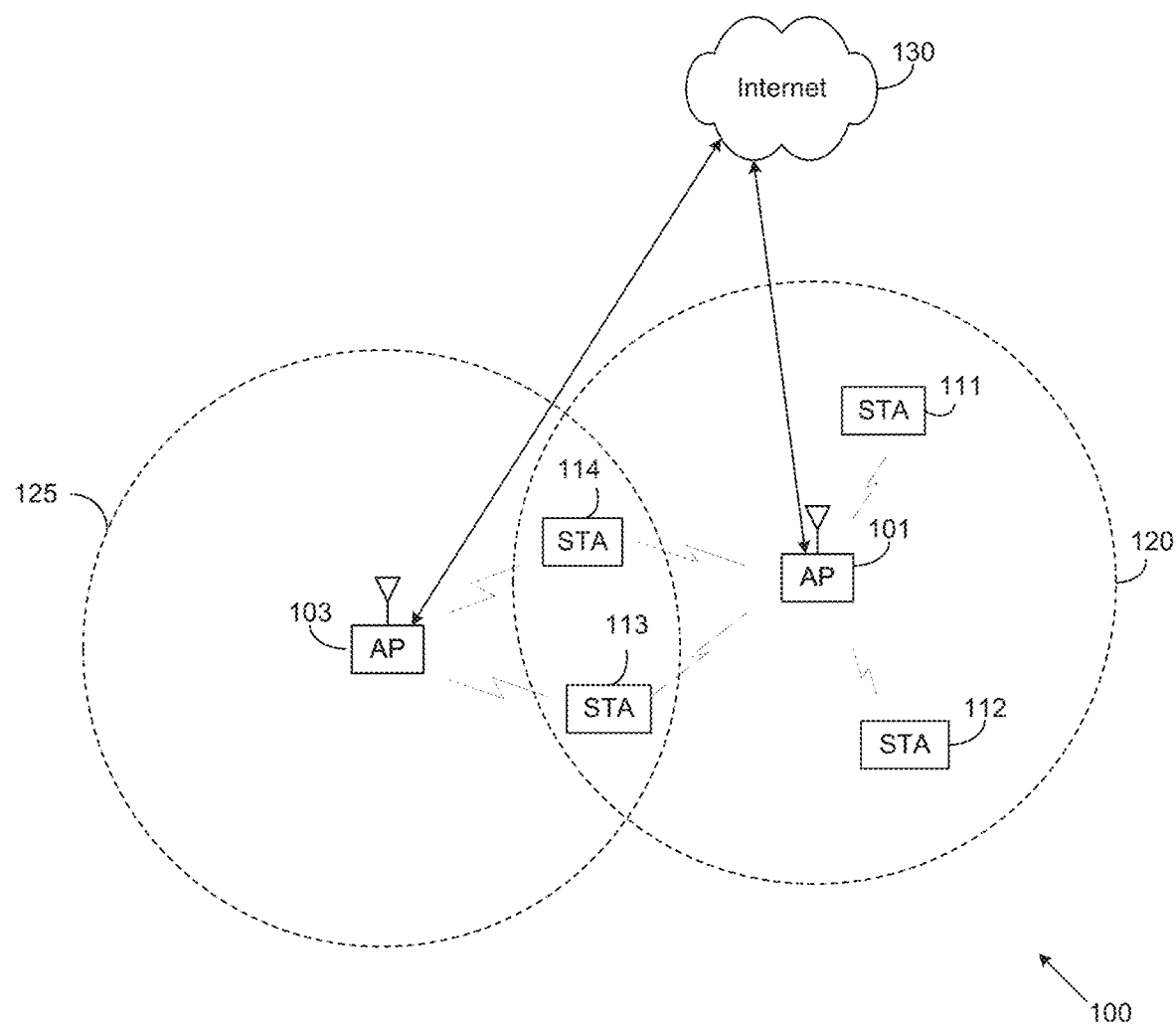
FIG. 1 illustrates an example wireless network according to this disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for presence detection and recognition of an object (such as a person, pet, or robot) utilizing Wi-Fi channel state information, and controlling smart home devices and features based on a determination that a three dimensional space (such as a room) is empty/vacant or occupied by the object or that the object has entered or exited a three dimensional space) in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
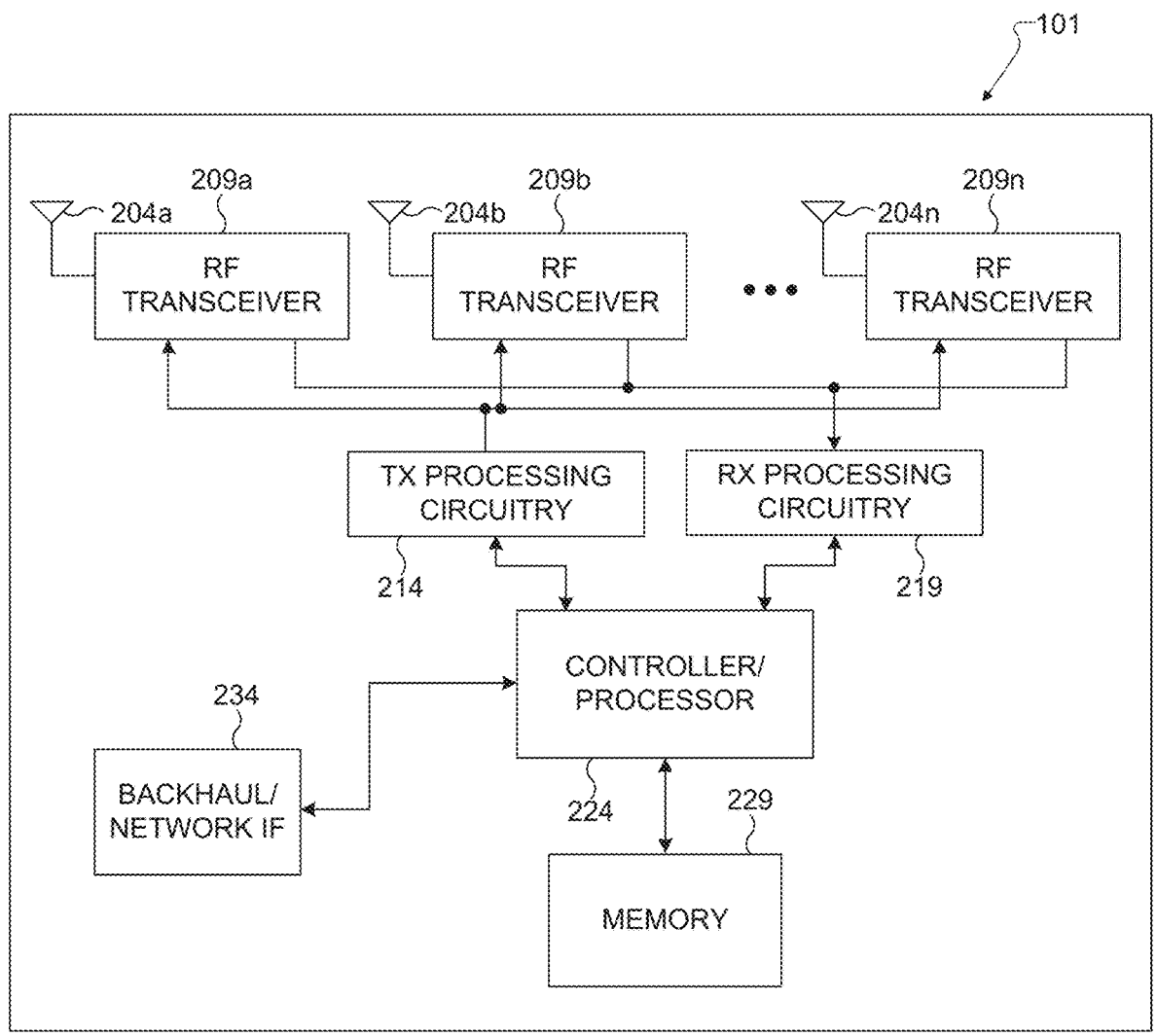
FIG. 2A illustrates an example access point (AP) according to this disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including presence detection and recognition of an object utilizing Wi-Fi channel state information, and controlling smart home features based on a determination that a three dimensional space (such as a room) is empty/vacant or occupied by the object or that the object has entered or exited a three dimensional space. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for presence detection and recognition of an object utilizing Wi-Fi channel state information, and controlling smart home devices and features based on a determination that a room is empty/vacant or occupied by the object or that the object has entered or exited the room. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
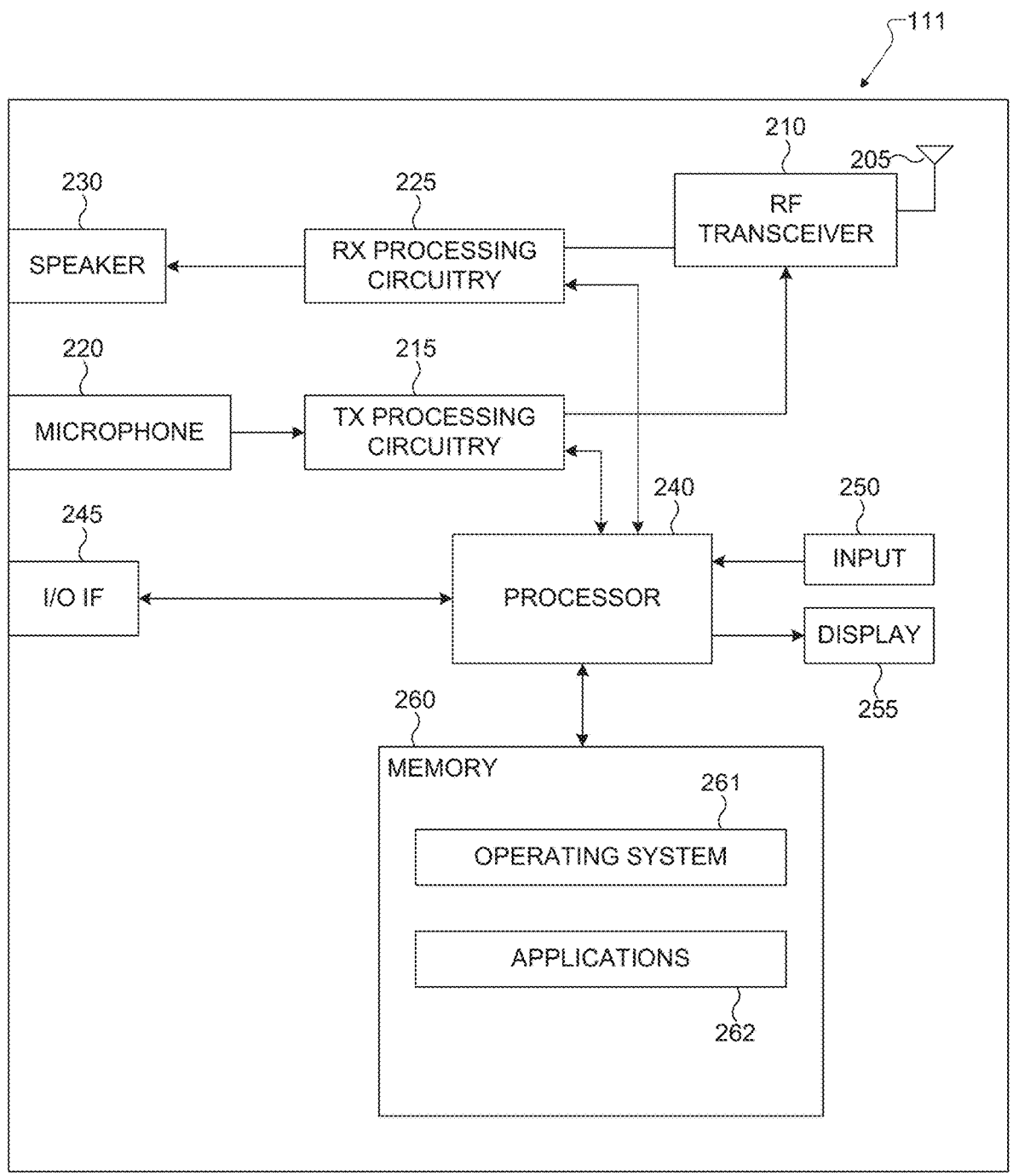
FIG. 2B illustrates an example station (STA) according to this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data). The RF transceiver 210 may set up communication between the STA 111 and an external electronic device (such as AP 101, a smart device, or a server). For example, the RF transceiver 210 may be connected with a network 130 through wireless communication to communicate with the external electronic device. Additionally, the RF transceiver 210 can establish a communication with the external electronic device 102 using a near field communication (NFC) or short-range communication protocol such as BLUETOOTH, WI-FI DIRECT, ZIGBEE or an ultra-wideband wireless technology.

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to detect presence and recognize an object utilizing Wi-Fi channel state information, and control smart home devices and features based on a determination that the object has entered or exited a room. In some embodiments, the controller/processor 240 includes at least one microprocessor or microcontroller.

The controller/processor 240 is also capable of executing other processes and programs resident in the memory 260, such as operations for presence detection and recognition of an object utilizing Wi-Fi channel state information, and controlling smart home features based on a determination that the object has entered or exited a room. The controller/processor 240 can move data into or out of the memory 260 as required by an executing process. In some embodiments, the controller/processor 240 is configured to execute a plurality of applications 262, such as applications for jointly detecting presence and recognizing an utilizing Wi-Fi channel state information, and controlling smart home devices and features based on a determination that the object has entered or exited a room. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
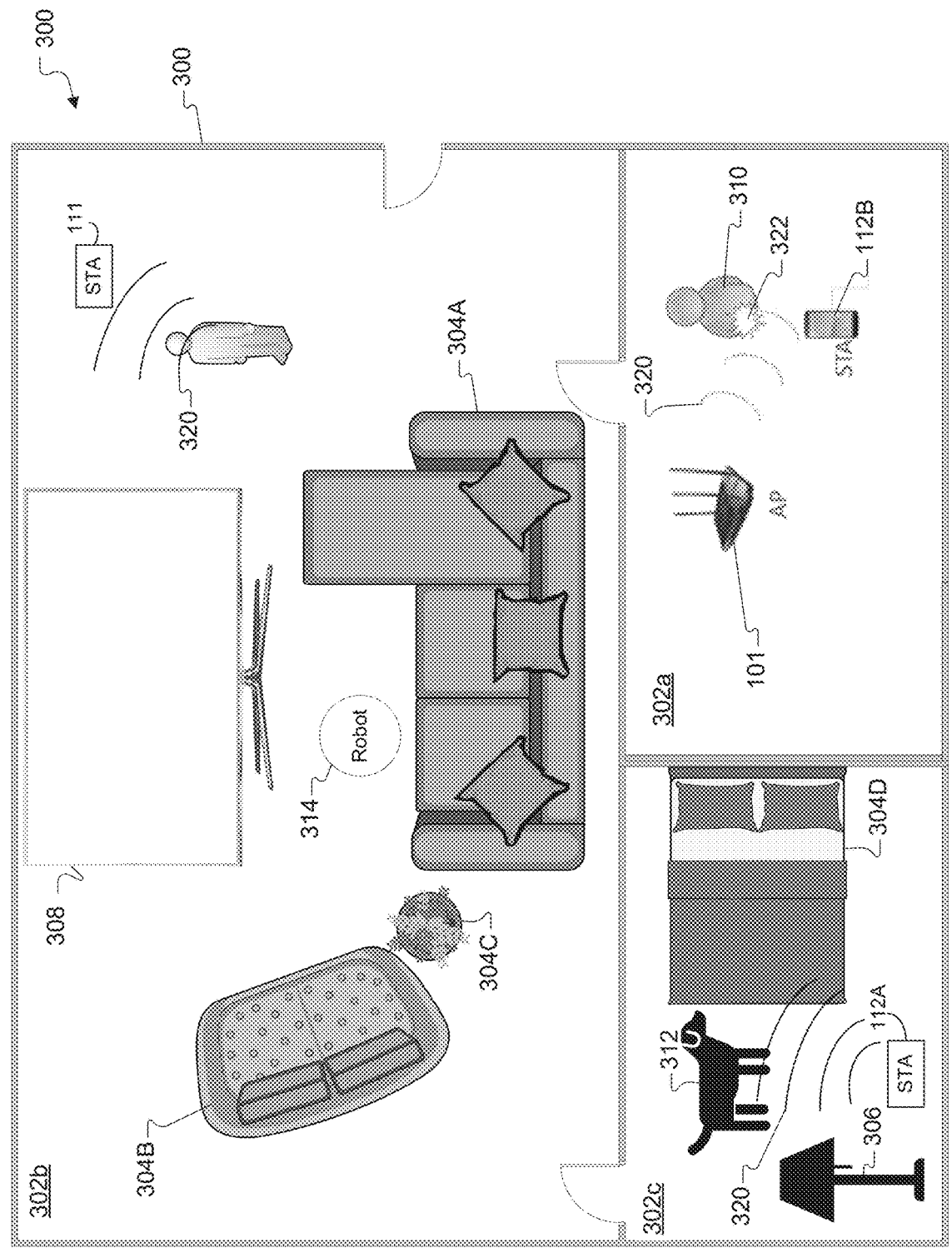
FIG. 3 illustrates an example Wi-Fi sensing system within a smart home in accordance with an embodiment of this disclosure.

FIG. 3 illustrates an example Wi-Fi sensing system 300 within a smart home 302 in accordance with an embodiment of this disclosure. The embodiment of the Wi-Fi sensing system 300 shown in FIG. 3 is for illustration only, and other embodiments could be used without departing from the scope of this disclosure.

The Wi-Fi sensing system 300 includes a transmitter, such as the AP 101, and at least one receiver, such as STA 111, 112A, and 112B. The smart home 302 includes one or more three-dimensional spaces, such as one or more rooms 302a-302c. The smart home 302 includes furniture 304a-304e that is stationary, such as a large sofa 304a, small sofa 304b, house plant on a plant stand 304c, and bed 304d. The smart home 302 includes one or more smart devices, such as a smart lamp 306 and a smart television 308.

The smart devices 306-308 may have smart features such as a power-saving feature to operate in a low power mode or to turn power off when a specified room is empty, and to wake up or turn power on when the specified room is occupied by an object, such as a person 310. In certain embodiments, when the current occupancy state of a first room 302a is an occupied state when a person 310 is present the first room 302a, but if the person 310 exits the first room 302a, then the current occupancy state of the first room 302a switches to an empty state (also referred to a vacant state). The current occupancy state of the first room 302a remains in the empty state if a pet 312 or a robot 314 enters the first room 302a without a person 310. In certain embodiments, when a person 310 or a pet 312 is present in a living room 302b, the current occupancy state of the living room 302b is the occupied state, and the current occupancy state of the living room 302b switches to the empty state when the person 310 and the pet 312 are not present in the living room 302b. The smart television 308 outputs media content (e.g., audio, images, video, or audiovisual content) when the current occupancy state of the living room 302b is in the occupied state but pauses or stops outputting the media content when the current occupancy state of the living room 302b switches to the empty state.

In order to determine whether a 3D space, such as the smart home 302 or a room 302a-302c, is occupied or empty, the AP 101 transmits a Wi-Fi signal 320, such as a beacon. If the person 310 is in the first room 302a, the Wi-Fi signal 320 may be incident upon the person 310 at a first location 322 and may be received by STA 112b. If the person 310 is in the living room 302b, the Wi-Fi signal 320 may be incident upon the person 310 at a second location and may be received by STA 111. The Wi-Fi signal 320 may be incident upon a pet 312 at a third location in the bedroom 302c and may be received by STA 112b. Each STA 111, 112a, 112b can analyze the received Wi-Fi to detect motion and/or a vital sign within a proximity to the STA and to determine an occupancy state of a 3D space based on the detected motion and/or vital sign.

Figure 4:
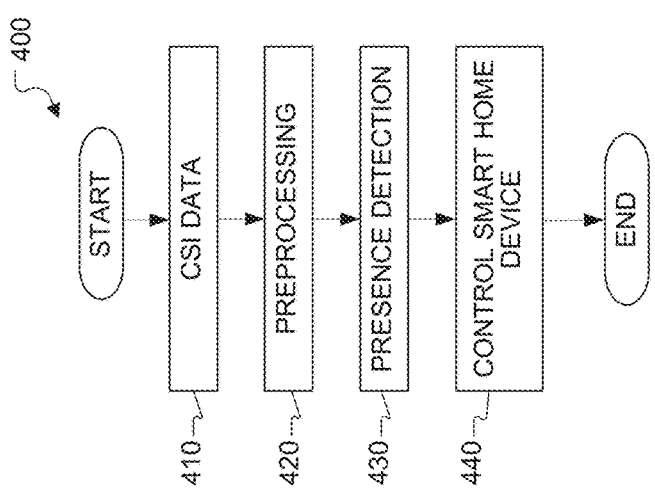
FIG. 4 illustrates an example method of Wi-Fi presence detection in accordance with an embodiment of this disclosure.

FIG. 4 illustrates an example method 400 of Wi-Fi presence detection in accordance with an embodiment of this disclosure. The embodiment of the method shown in FIG. 4 is for illustration only, and other embodiments could be used without departing from the scope of this disclosure.

At the start of the method 400, a Wi-Fi communication link is established between an AP, such as AP 101, and at least one STA, such as STA 111. At block 410, the STA 111 receives CSI data from the AP 101. In one embodiment, the STA includes two receive antennas for Wi-Fi communication, and the CSI data is received via the two receive antennas. In another embodiment, the STA includes at least one antenna for Wi-Fi communication, and the CSI data is received via the at least one antenna. At block 420, the STA 111 preprocesses the received CSI data. For example, preprocess the CSI data to remove one or more anomaly data points and generate preprocessed CSI data. At block 430, the STA 111 performs presence detection, namely, determining whether a 3D space is occupied or empty. At block 440, based on a result or output of the presence detection, the STA 111 controls a smart home device, such as smart television 308.

Figure 5:
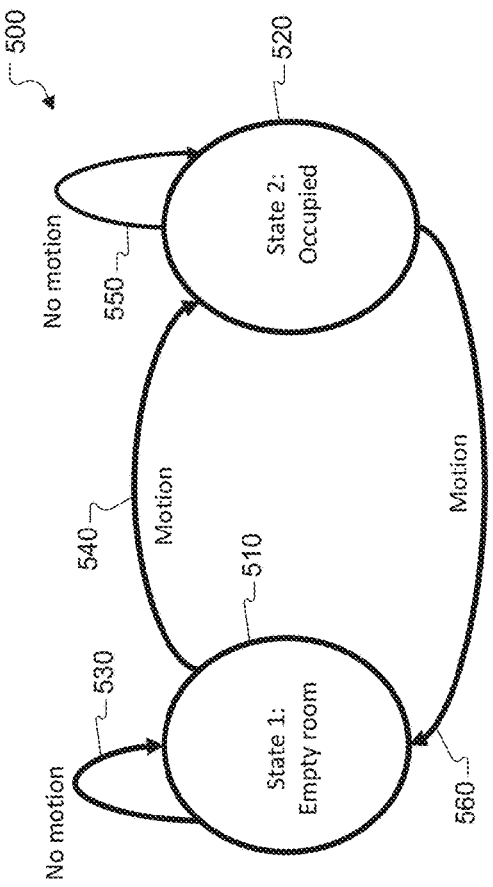
FIG. 5 illustrates a first state machine of an occupancy state in accordance with an embodiment of this disclosure.

FIG. 5 illustrates a first state machine 500 of an occupancy state in accordance with an embodiment of this disclosure. The first state machine 500 represents a current occupancy state of a 3D space, such as a living room 302b or within a first threshold distance of the television 308. The embodiment of the first state machine 500 shown in FIG. 5 is for illustration only, and other embodiments could be used without departing from the scope of this disclosure.

The current occupancy state of the 3D space is based on whether motion of an object (such as a person 310) is detected in the 3D space. The occupancy state of the 3D space can be a first state, which is referred to as the empty state 510, or can be a second state, which is referred to as the occupied state 520, but cannot concurrently be both empty and occupied states. While in the empty state 510, the first state machine 500 outputs a first indicator indicating that the 3D space is in the empty state, in response to the determination that an object (for example, a person 310) is not present in the 3D space (e.g., living room 302b). While in the occupied state 520, the first state machine 500 outputs a second indicator indicating that the 3D space is in the occupied state, in response to the determination that the object is present in the 3D space (e.g., living room 302b).

After the current state of the 3D space has been determined, presence detection may be repeated by the STA 111 or the Wi-Fi sensing system 300. If the STA 111 detects no motion 530 of an object while in the empty state 510, then the current state remains unchanged, the state machine 500 continues to output the first indicator of the empty state 510. While in the empty state 510, if the STA 111 detects motion 540 of the object, then the current state of the 3D space changes to the occupied state 520. For example, the detected motion 540 may represent a person 310 entering the living room 302b.

If the STA 111 detects no motion 550 of an object while in the occupied state 520, then the current state remains unchanged, the state machine 500 continues to output the second indicator of the occupied state 520. While in the occupied state 520, if the STA 111 detects motion 560 of the object, then the current state of the 3D space changes to the empty state 510. For example, the detected motion 560 may represent a person 310 exiting the living room 302b.

Figure 6:
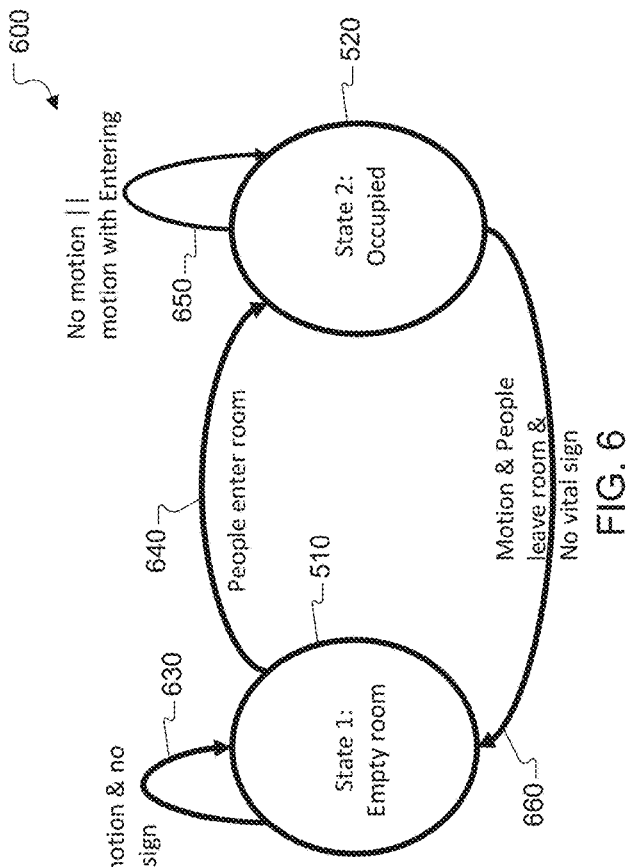
FIG. 6 illustrates a second state machine of vital sign detection in accordance with an embodiment of this disclosure.

FIG. 6 illustrates a second state machine 600 of vital sign detection in accordance with an embodiment of this disclosure. The empty state 510 and occupied state 520 of FIG. 5 are the same in the second state machine 600 of FIG. 6. The embodiment of the second state machine 600 shown in FIG. 6 is for illustration only, and other embodiments could be used without departing from the scope of this disclosure.

In the second state machine 600, vital sign information is used to detect whether a 3D space (such as a room) is empty or not. Particularly, the second state machine 600 is designed to detect whether a room is occupied or not based on the vital sign detection results.

The current occupancy state of the 3D space is not only based on whether motion of an object (such as a person 310) is detected in the 3D space, but additionally is based on whether a vital sign is detected in the 3D space. While in the empty state 510, if the STA 111 detects no motion an object and no vital sign 630 within the 3D space, then the current state remains unchanged, and the state machine 600 continues to output the first indicator of the empty state 510. While in the empty state 510, if the STA 111 detects motion of the object or detects a vital sign in the 3D space, then the current state of the 3D space changes (as shown by the arrow 640) to the occupied state 520. For example, the detected motion and/or detected vital sign (as shown by the arrow 640) may represent a person 310 occupies or people entering the living room 302b.

Similarly, the current state remains unchanged and the second state machine 600 continues to output the second indicator if, while in the occupied state 520, a detection 650 of motion or motion associated with entering the 3D space occurs. The current state of the 3D space changes to the empty state 510 if, while in the occupied state 520, the STA 111 again detects 660 no vital sign in the 3D space or detects motion associated with the object exiting the 3D space.

Figure 7:
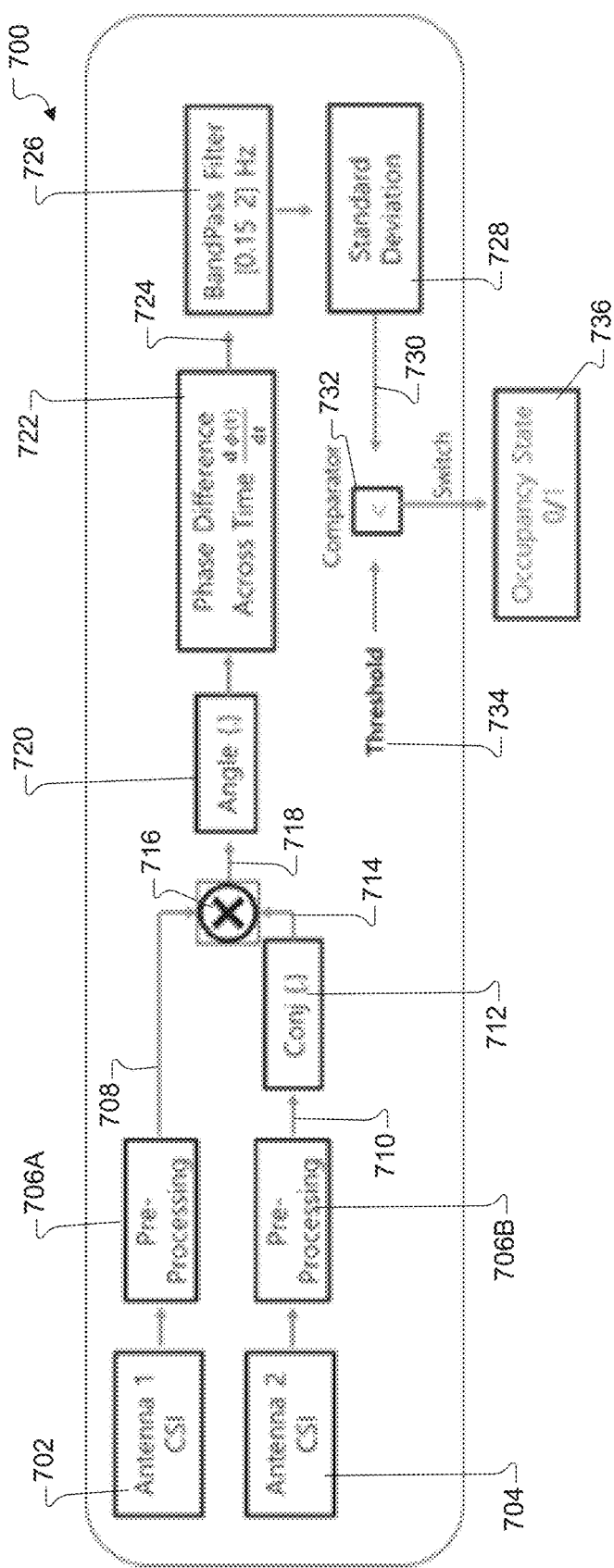
FIG. 7 illustrates a block diagram of Wi-Fi sensing for occupancy detection in accordance with a first embodiment of this disclosure.

FIG. 7 illustrates a block diagram of Wi-Fi sensing occupancy detection algorithm 700 in accordance with a first embodiment of this disclosure. The embodiment of the occupancy detection algorithm 700 shown in FIG. 7 is for illustration only, and other embodiments could be used without departing from the scope of this disclosure.

In this embodiment of this disclosure, the STA 111 includes two receive antennas that are used for Wi-Fi communication, including a first communication antenna (illustrated as "Antenna 1") and a second communication antenna (illustrated as "Antenna 2"). To execute the occupancy detection algorithm 700, the STA receives first CSI data 702 for the first communication antenna and receives second CSI data 704 for the second communication antenna. The first CSI data 702 includes a complex number, which includes multiple first magnitude values and multiple first phase values across multiple valid subcarriers. Similarly, second CSI data 704 includes a complex number, which includes multiple second magnitude values and multiple second phase values across multiple valid subcarriers.

Once the first and second CSI data 702 and 704 from two receive antennas are received, both will first go through preprocessing. Particularly, the first CSI data 702 undergoes preprocessing at a first preprocessing block 706a, and the second CSI data 704 undergoes preprocessing at a second preprocessing block 706b. In certain embodiments, the first and second preprocessing blocks 706a-706b are identical, so for simplicity, they 706a-706b are generally referred to as preprocessing block 706. To generate preprocessed CSI data, the preprocessing block 706 removes one or more anomaly data points and outputs first preprocessed CSI data 708 and second preprocessed CSI data 710.

One of the preprocessed CSI data will go through the conjugation module 712. In the example shown, the conjugation module 712 conjugates the second preprocessed CSI data 710 to generate a conjugate 714 of the second CSI data.

A mixer 716 mixes the CSI data from one antenna with the conjugation of the CSI from another antenna by multiplying the two inputs. Particularly, to generate mixed complex CSI data 718, the mixer 716 multiplies the first preprocessed CSI data 708 by the conjugate 714 of the second CSI data. The mixer 716 processes the CSI data according to Equation 1, wherein CSI data from one antenna is denoted as $x_1(f,t)$, and CSI data from another antenna is denoted as $x_2(f,t)$. Denote the mixed complex CSI data 718 as $y(f,t)$, wherein f represents frequency and t represents time. The mixer 716 can remove the OFDM symbol boundary error and sampling time error.

$$y(f,t)=x_1(f,t)\times\operatorname{conj}(x_2(f,t)) \quad (1)$$

In accordance with Equation 2, a phase angle determiner 720 calculates a phase information of the signal y, and an unwrapper 722 unwraps the phase information in the time domain. More particularly, for the complex numbers within the mixed complex CSI data 718, the phase angle determiner 720 calculates an angle of each complex number for each subcarrier. The phase angle of the mixed complex CSI data 718 is denoted as $\operatorname{angle}(y(f,t))$. The unwrap phase information 724 is denoted as $p(f,t)$. By executing the Wi-Fi sensing occupancy detection algorithm 700, the STA is able to detect a person is breathing within proximity to the STA. Particularly, the unwrap phase information 724 captures or otherwise represents the chest movement of a person.

$$p(f,t)=\operatorname{unwrap}(\operatorname{angle}(y(f,t))) \quad (2)$$

Next within the Wi-Fi sensing occupancy detection algorithm 700 is to fuse the information from different subcarriers and identify the period or frequency of the phase information $p(f,t)$. Particularly, at the unwrapper 722, there is a cubic value that is in the spatial domain (also referred to as antenna domain), the frequency domain (also referred to as subcarrier domain), and time domain. Phase difference is calculated across the time domain (illustrated as $$\frac{d\varphi(t)}{dt}$$

at unwrapper 722) and passed though the band-pass filter 726. In certain embodiments, the band-pass filter 726 has a cutoff frequency of 0.15 to 2 Hertz (Hz). To capture the variation of CSI, a variation determiner 728 calculates a standard deviation 730 over the different subcarriers. Particularly, the variation determiner 728 determines the standard deviation 730 of a first order derivation of phase values over a time domain, a spatial domain defined by antenna, and a subcarrier domain.

A comparator 732 compares the standard deviation 730 to a threshold motion value 734. The threshold motion value 734 can be a threshold difference. The threshold motion value 734 is predetermined to indicate that motion of an object (such as a person, robot, or pet) is detected in the 3D space within a threshold distance to the STA. In a particular embodiment, the threshold motion value 734 is predetermined to indicate that chest movement of a person is detected in the 3D space. A detection of motion of an object is a determination that the object is present in the 3D space, and a detection of no motion of the object is a determination that the object is not present in the 3D space. If the standard deviation 730 is not greater than the threshold motion value 734, then the 3D space is vacant. The comparator 732 outputs a first indicator (such as a value of 0) indicating that the 3D space is in an empty state. Otherwise, if the standard deviation 730 is greater than the threshold motion value 734, then the 3D space (e.g., room) is occupied. The comparator 732 outputs a second indicator (such as a value of 1) indicating that the 3D space is in an occupied state. The output (namely, one among the first indicator and the second indicator) from the comparator 732 determines the current occupancy state 736 of the 3D space. In certain embodiments, the current occupancy state 736 of the 3D space is stored in memory 260 of the STA. In certain embodiments, the STA additionally transmits the current occupancy state 736 of the 3D space to an external device, such as the AP 101.

The output of Wi-Fi sensing occupancy detection algorithm 700 (for example, output of the comparator 732) controls a state machine, such as the state machine 500 of FIG. 5. In certain embodiments, when the standard deviation 730 is larger than a threshold (for example, threshold 734 of FIG. 7), the first state machine 500 (FIG. 5) changes from one state to another state. In certain embodiments, whenever the standard deviation 730 is greater than the threshold motion value 734 twice, the first state machine 500 switches from one state to another state. In certain embodiments, the first state machine 500 will change to the occupied state when the standard deviation 730 is larger than a threshold motion value 734; the first state machine 500 will change such that the state becomes neutral only when the standard deviation 730 becomes less than the threshold motion value 734; and then first state machine 500 will change to the vacant state if the standard deviation 730 becomes greater than the threshold motion value 734 again.

Figure 8:
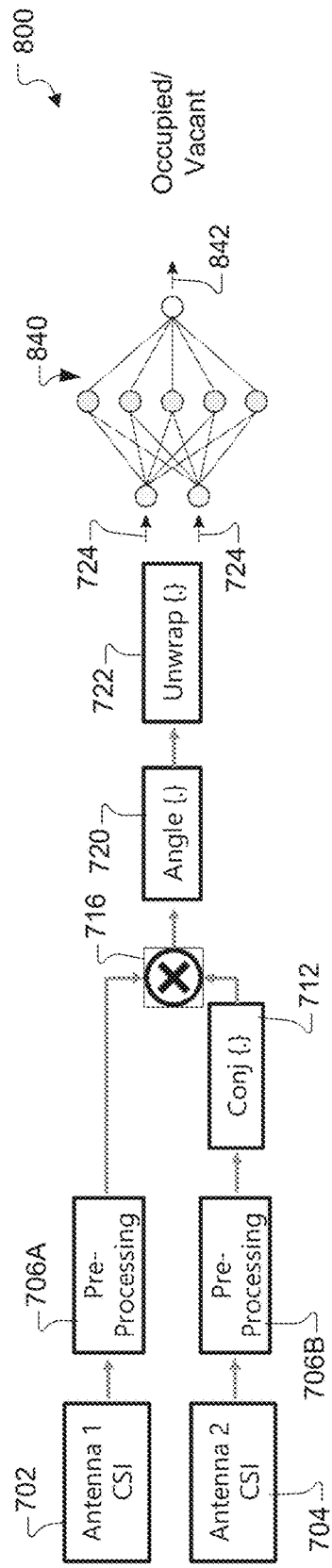
FIG. 8 illustrates a block diagram of neural network-based occupancy detection in accordance with an embodiment of this disclosure.

FIG. 8 illustrates a block diagram of neural network-based occupancy detection algorithm 800 in accordance with an embodiment of this disclosure. The embodiment of the neural network-based occupancy detection algorithm 800 shown in FIG. 8 is for illustration only, and other embodiments could be used without departing from the scope of this disclosure.

The neural network-based occupancy detection algorithm 800 can utilize some of the components of the Wi-Fi sensing occupancy detection algorithm 700 of FIG. 7, for example, inputs of first CSI data 702 and second CSI data 704, preprocessing blocks 706, conjugation module 712, mixer 716, phase angle determiner 720, and unwrapper 722. In the neural network-based occupancy detection algorithm 800, phase information 836 that includes the unwrapped phase information 724 of CSI are input to a neural network 840 for occupancy detection. The output 824 of the neural network-based occupancy detection algorithm 800 controls a state machine, such as the state machine 500 of FIG. 5. The output 824 (namely, one among the first indicator and the second indicator) from the neural network 840 determines the current occupancy state of the 3D space within the threshold distance of the STA. The output 824 of the neural network-based occupancy detection algorithm 800 controls a state machine, such as the state machine 500 of FIG. 5.

Figure 9:
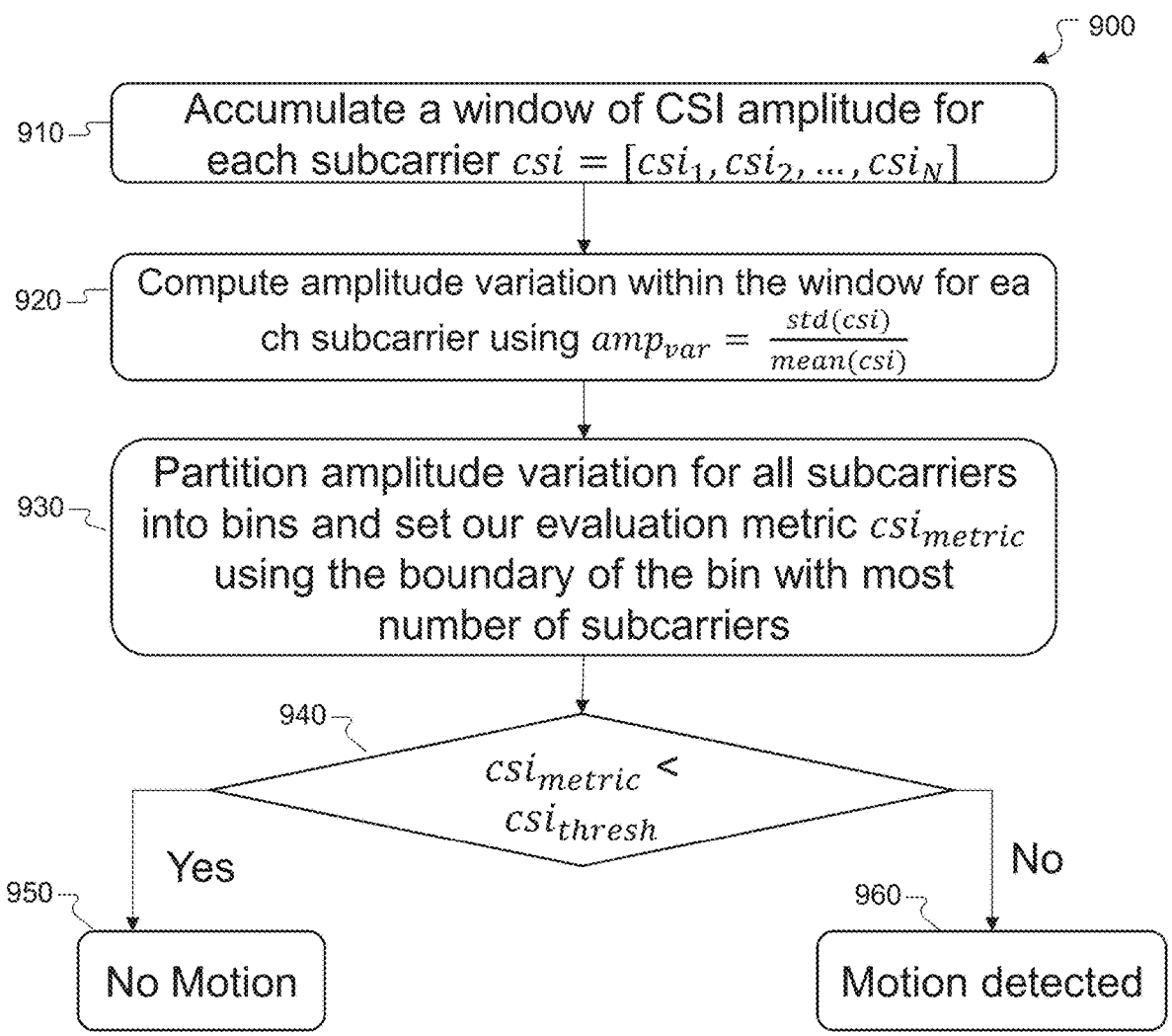
FIG. 9 illustrates an example method of occupancy detection with normalized standard deviation of CSI amplitude in accordance with a second embodiment of this disclosure.

FIG. 9 illustrates an example method 900 of occupancy detection with normalized standard deviation of CSI amplitude in accordance with a second embodiment of this disclosure. The embodiment of the method 900 shown in FIG. 9 is for illustration only, and other embodiments could be used without departing from the scope of this disclosure. The method 900 is performed by a STA (such as STA 111) that includes at least one antenna for Wi-Fi communication, which can include multiple antennas for Wi-Fi communication in certain embodiments. For simplicity, the method 900 will be described as being performed by a STA 111 that includes one antenna for Wi-Fi communication.

At block 910, during a window of time, the STA 111 accumulates CSI amplitude values for each subcarrier in a set of subcarriers. The window of time has size of X seconds, for example, X could be 1 second. The set of subcarriers includes multiple subcarriers, such as 64 subcarriers. From among the set of subcarriers, a respective subcarrier corresponds to a number N of CSI amplitude values (illustrated as csi=[$csi_1$, $csi_2$, ..., $csi_N$]) indexed by i from 1=1 through i=N. During the window of time, CSI amplitude values are accumulated over each subcarrier is the input to the algorithm, namely, the method 900. At a respective point in time, the STA 111 can receive an input matrix that includes a row per subcarrier and a column per receive antenna. In the example case of one receive antenna and 64 subcarriers, the STA 111 receives an input vector having 64 rows in 1 column, and the input vector may vary across the time domain.

At block 920, for each of the subcarriers, the STA 111 computes an amplitude variation $amp_{var}$ based on the CSI amplitude values accumulated during the window of time. The amplitude variation can be calculated according to Equation 3. Particularly within Equation 3, a normalized standard deviation is calculated over the amplitude of CSI signals and is referred to as the amplitude variation. One way to normalize the standard deviation std(csi) is to divide it by the mean value mean(csi) as shown in Equation 3. In the example case of 64 subcarriers, the STA 111 calculates a normalized standard deviation of CSI amplitude 64 times, as one amplitude variation per subcarrier.

$$amp_{var} = \frac{std(csi)}{mean\ (csi)} \quad (3)$$

At block 930, the STA 111 partitions the amplitude variation for all subcarrier in the set of subcarriers into bins. From among the bins, a selected bin includes the greatest number of subcarriers. Further at block 930, the STA 111 sets an evaluation metric $csi_{metric}$ based on a boundary of a selected bin. The evaluation metric $csi_{metric}$ is a statistic of the normalized standard deviation over all the subcarriers. In one example, the statistic could be the median value or mean value, calculated according to Equation 4.

$$csi_{metric} = median(amp_{var}) \quad (4)$$

To determine if the room is occupied by an object that exhibits motion or not, at block 940, the evaluation metric $csi_{metric}$ that has been set is compared to a predefined threshold $csi_{thresh}$. At block 950, the STA 111 detects no motion of an object within a threshold distance to the STA, based on a determination that the evaluation metric $csi_{metric}$ is less than the predefined threshold $csi_{thresh}$. At block 960, the STA 111 detects motion of an object within the threshold distance to the STA, based on a determination that the evaluation metric $csi_{metric}$ is not less than the predefined threshold $csi_{thresh}$. The output (such as block 950 or block 960) of the method 900 of occupancy detection controls a state machine, such as the state machine 500 of FIG. 5.

Figure 10:
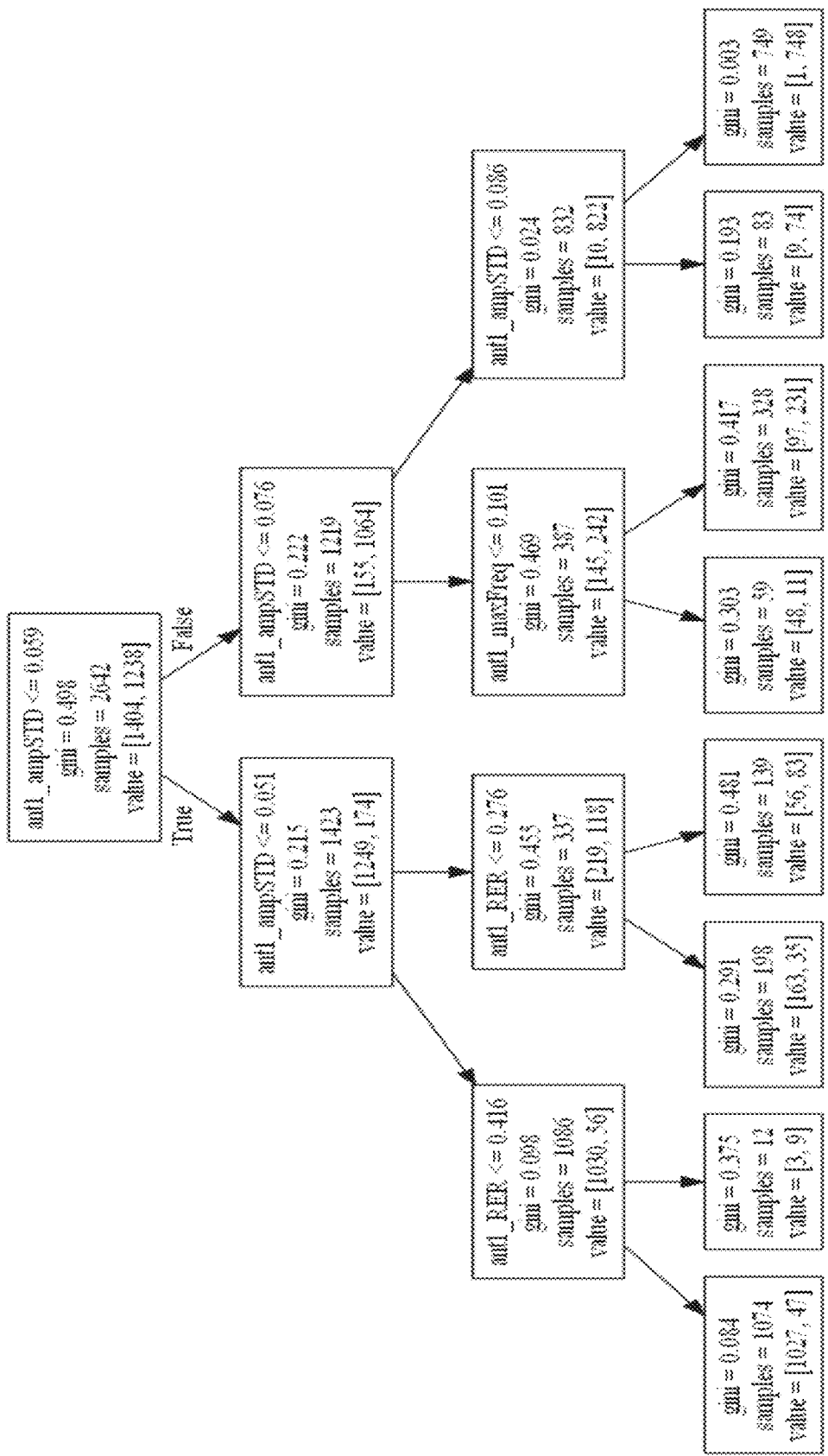
FIG. 10 illustrates an example decision tree for rule-based occupancy detection in accordance with an embodiment of this disclosure.

FIG. 10 illustrates an example decision tree 1000 for rule-based occupancy detection in accordance with an embodiment of this disclosure. The embodiment of the decision tree 1000 shown in FIG. 10 is for illustration only, and other embodiments could be used without departing from the scope of this disclosure. The decision tree 1000 is used by the STA 111 to determine whether a room is empty or occupied, based on vital sign signals. The input feature includes a normalized standard deviation of CSI amplitude, respiration energy ratio with extended frequency range, respiration rate, and standard deviation of antenna phase difference. In this example, "ant1_ampSTD" (as illustrated various decision blocks of the decision tree 1000) represents the normalized standard deviation of CSI amplitude ("ampSTD") for one antenna (illustrated as "ant1") of the STA 111. The output of this decision tree is a determination whether a vital sign is detected in the room (namely, a 3D space within a threshold distance of the STA). If a vital sign is detected, then a determination is made that the room is occupied, but if a vital sign is not detected, then a different determination is made that the room is empty.

Figure 11:
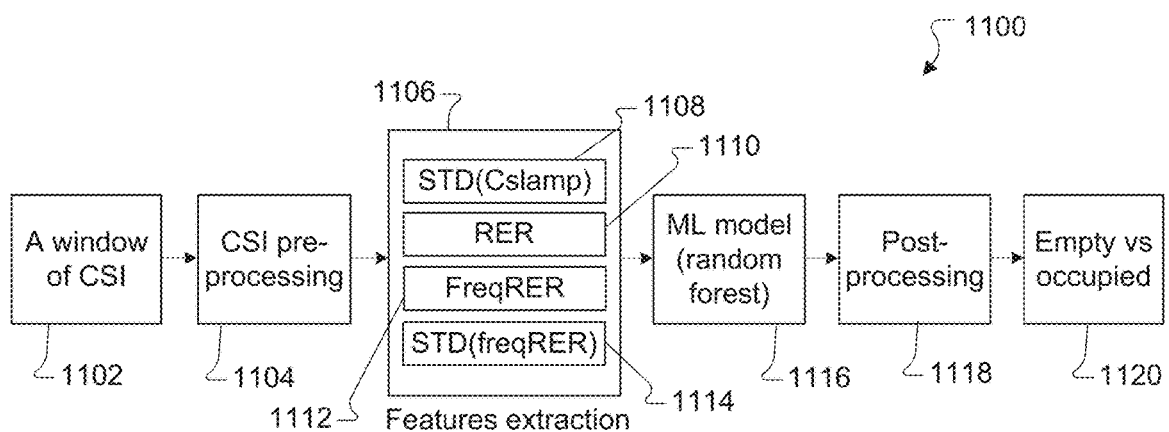
FIG. 11 illustrates a block diagram for decision tree-based occupancy detection in accordance with an embodiment of this disclosure.

FIG. 11 illustrates a block diagram for decision tree-based occupancy detection algorithm 1100 in accordance with an embodiment of this disclosure. The embodiment of the algorithm 1100 shown in FIG. 11 is for illustration only, and other embodiments could be used without departing from the scope of this disclosure.

At block 1102, a window of CSI data is received. The procedure performed at block 1102 can be the same as or similar to the procedure of block 910 of FIG. 9. In one example, the window size is 20 seconds. At block 1104, the window of CSI data is preprocessed to remove anomalies. The procedure performed at block 1104 can be the same as or similar to the preprocessing block 706 of FIG. 7.

At block 1106, key features are calculated, for example, the STA 111 performs features extraction. As described above, extracted features are to be input to the decision tree 1000. The features include a normalized standard deviation of CSI amplitude 1108, respiration energy ratio 1110 with extended frequency range, respiration rate 1112 (illustrated as "FreqRER"), and standard deviation 1114 of antenna phase difference. In certain embodiments, the extended range of respiration energy ratio (RER) is from 0.1 Hz to 2 Hz. In one certain embodiments of this algorithm 1100, the input features (such as shown within block 1106) include a combination of the following features processed over a window of CSI signals. The combination of features (such as shown within block 1106) could include but is not limit to: 1) the median of normalized standard deviation of CSI amplitude; 2) the respiration energy ratio 1110; 3) median of detected respiration rate over all subcarriers; and 4) standard deviation of the detected respiration rate across all subcarriers.

At block 1116, the key features are input to a machine learning (ML) model to obtain instant results. The ML model can be a random forest ML model. The output of the ML model at block 1116 is a determination whether a vital sign is detected in the room (namely, a 3D space within a threshold distance of the STA). In certain embodiments, the decision tree 1000 of FIG. 10 is used to train the ML model of block 1116. The output of the ML model at block 1116 can indicate whether the room is empty or not. However, the output of the ML model at block 1116 may be multi-shot results that can change quickly. If quick changes to the occupancy state of the room is allowed to control a smart device, such as the smart television 308, then the television may quickly switch between power on and power off states, which may be undesirable user experience.

At block 1118, the STA post-processes the output of the ML model of block 1116 is to generate a stabilized determination whether the room is in an empty state or occupied state. The post-processing fuses the multi-shot results output by ML model of block 1116. In certain embodiments, the post-processed data output from block 1118 is a majority vote of an accumulation of outputs from the ML model of block 1116, accumulated over the duration of the window of time (for example, 20 second). The stabilized output from the post-processing block 118 is more accurate than the output from the ML model of block 1116, which can include some misdetections. In a particular example, if ML model of block 1116 outputs a determination every 2 seconds, then the post-processing block 1118 may receive a stream of inputs 1110100101-0-1-1 over a course of 26 seconds and generate majority vote per sliding window of 10 inputs. For a first window of time corresponding to inputs 1110100101, which contains six-ones, a first majority vote would be a value of 1, which is the second indicator that the room is occupied. For a next, second window of time corresponding to inputs 110100101-0, which contains five-ones, which is no majority. In the case of no majority, the STA can be configured to maintain the current state in one embodiment or configured to change to the other state in another embodiment. The third window of time has no majority. A fourth window of time corresponding to 0100101-0-1-1, which contains six zeros, the fourth majority vote would be a value of 0, which is the first indicator that the room is empty.

At block 1120, a final determination regarding whether the 3D space is empty or occupied is output. For example, the output of the post-processing block 1118 can control a state machine, such as the state machine 600 of FIG. 6.

Figure 12:
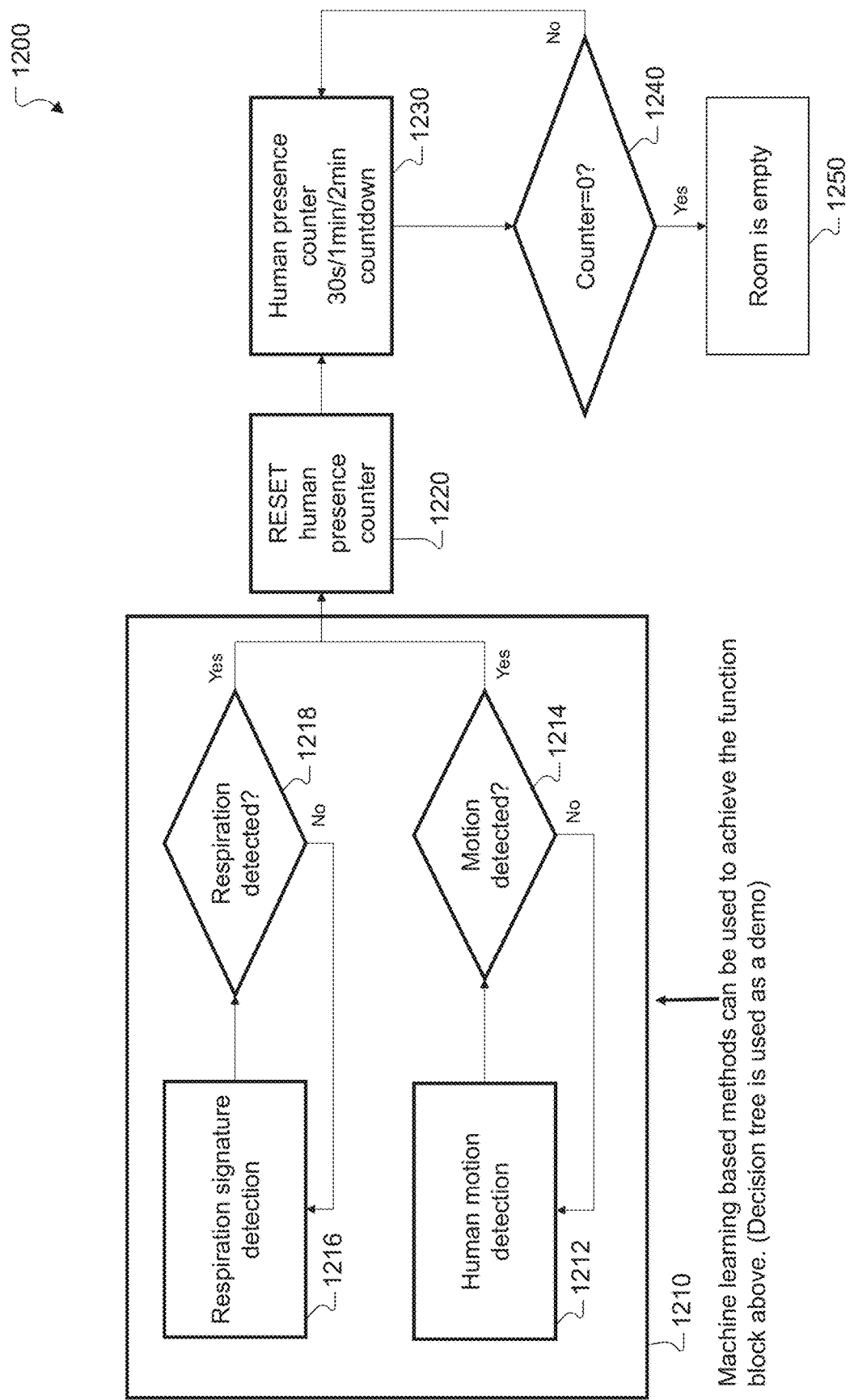
FIG. 12 illustrates a flow diagram of occupancy detection with vital sign detection and counters in accordance with an embodiment of this disclosure.

FIG. 12 illustrates a flow diagram of a method 1200 of occupancy detection with vital sign detection and counters in accordance with an embodiment of this disclosure. The embodiment of the method 1200 shown in FIG. 12 is for illustration only, and other embodiments could be used without departing from the scope of this disclosure.

At block 1210, the STA determines whether at least one of a vital sign or motion of an object is detected in the 3D space. Particularly, at block 1212, to determine whether motion of an object is detected in the 3D space, the STA executes an occupancy detection algorithm, such as the method 400 of Wi-Fi presence detection of FIG. 4, Wi-Fi sensing occupancy detection algorithm 700 of FIG. 7, neural network-based occupancy detection algorithm 800 of FIG. 8, or the method 900 of occupancy detection of FIG. 9. At block 1214, if human motion is detected, the STA triggers a human presence counter to reset, but if no motion of a human is detected, the method 1200 returns to block 1212 to continue sensing for motion. Also, at block 1216, to determine whether a vital sign is detected in the 3D space, the STA executes the decision tree-based occupancy detection algorithm 1100 of FIG. 11, which may utilize the decision tree 1000 of FIG. 10. A vital sign is detected if a respiration signature is detected at block 1216. At block 1218, if a vital sign is detected, the STA triggers a human presence counter to reset, but if no vital sign is detected, the method 1200 returns to block 1216 to continue sensing for a vital sign. The procedures of blocks 1216 and 1214 can be performed concurrently or in parallel with the procedures of blocks 1212 and 1214.

At block 1220, a human presence counter is reset, in response to the detection of a vital sign or the detection of motion of the object in the 3D space. At block 1230, the human presence counter commences counts down. For example, the human presence counter can be a 30-seconds timer, a 1-minute timer, or a 2-minute timer. At block 1240, the STA determines whether the countdown of the human presence counter equals zero, which is when the when the countdown is complete. During the countdown at block 1230, if additional motion of the object is detected or if the vital sign is again detected in the 3D space, then the human presence counter is reset at block 1220 and commences a new countdown at block 1230. During the countdown at block 1230, if no motion of the object is detected and if no vital sign is detected in the 3D space, then the current occupancy state of the 3D space remains the occupied state until the countdown is complete. At block 1250, the STA determines that the room is in an empty state, in response to a determination that the countdown of the human presence counter equals zero.

Figure 13:
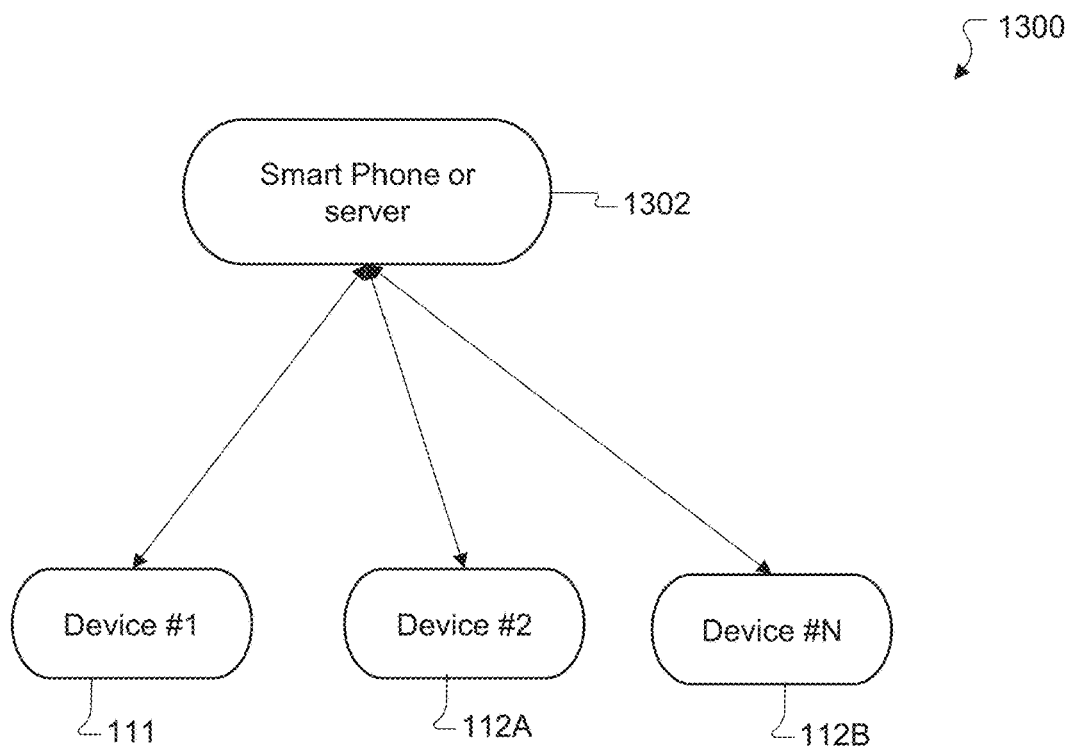
FIG. 13 illustrates a centralized system architecture including a server for multiple devices sensing in collaboration in accordance with an embodiment of this disclosure.
Figure 14:
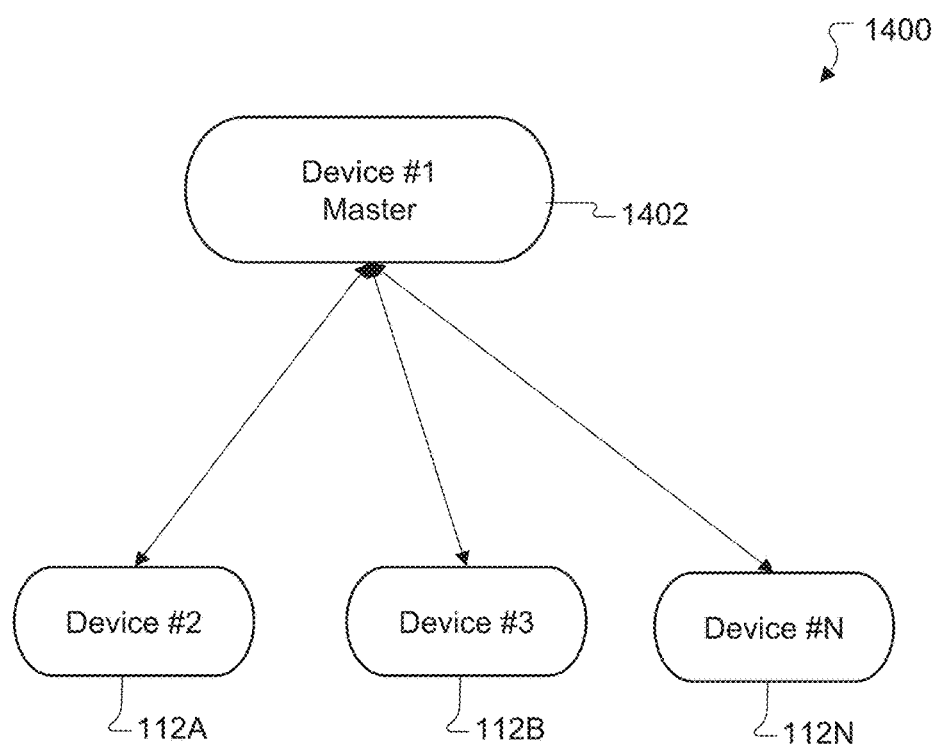
FIG. 14 illustrates a centralized system architecture including a selected device as a master device for multiple devices sensing in collaboration in accordance with an embodiment of this disclosure.

FIGS. 13 and 14 illustrate that multiple devices are designed to collaborate together to conduct room occupancy detection. When both a transmitter and receiver detect similar features of fluctuations in CSI data that occur close in time, it is ambiguous whether the location of the motion of object is near the transmitter or near the receiver. The ambiguity of motion at the AP 101 or at the receiver device side can be resolved by utilizing a collaboration-based centralized system architecture from FIG. 13 or 14. The embodiments of the architectures 1300 and 1400 shown in FIGS. 13 and 14 are for illustration only, and other embodiments could be used without departing from the scope of this disclosure.

FIG. 13 shows a collaboration-based centralized system architecture 1300 in which all the sensing raw data from multiple devices are sent to a server or a smart phone. Then the smart phone or server will make a final decision of occupancy state. Particularly, FIG. 13 illustrates a collaboration-based centralized system architecture 1300 including a server 1302 (or smartphone) for multiple STA devices 111, 112A-112B sensing in collaboration in accordance with an embodiment of this disclosure. In an embodiment in which the server 1302 is replaced by a smartphone, the smartphone executes a smart things app (such as application 262 of FIG. 2), and the smartphone will make the final sensing decision of occupancy state after receiving all the sensing processed data from all the other devices.

FIG. 14 shows another collaboration-based centralized system architecture 1400 in which one device (for example, STA 111) is elected as the master device 1402, and all other devices (for example, STAs 112A, 112B, 112N) send their signals including either raw data or processed data to the master device 1402. Then the master device 1402 will make a final decision of occupancy state.

Figure 15:
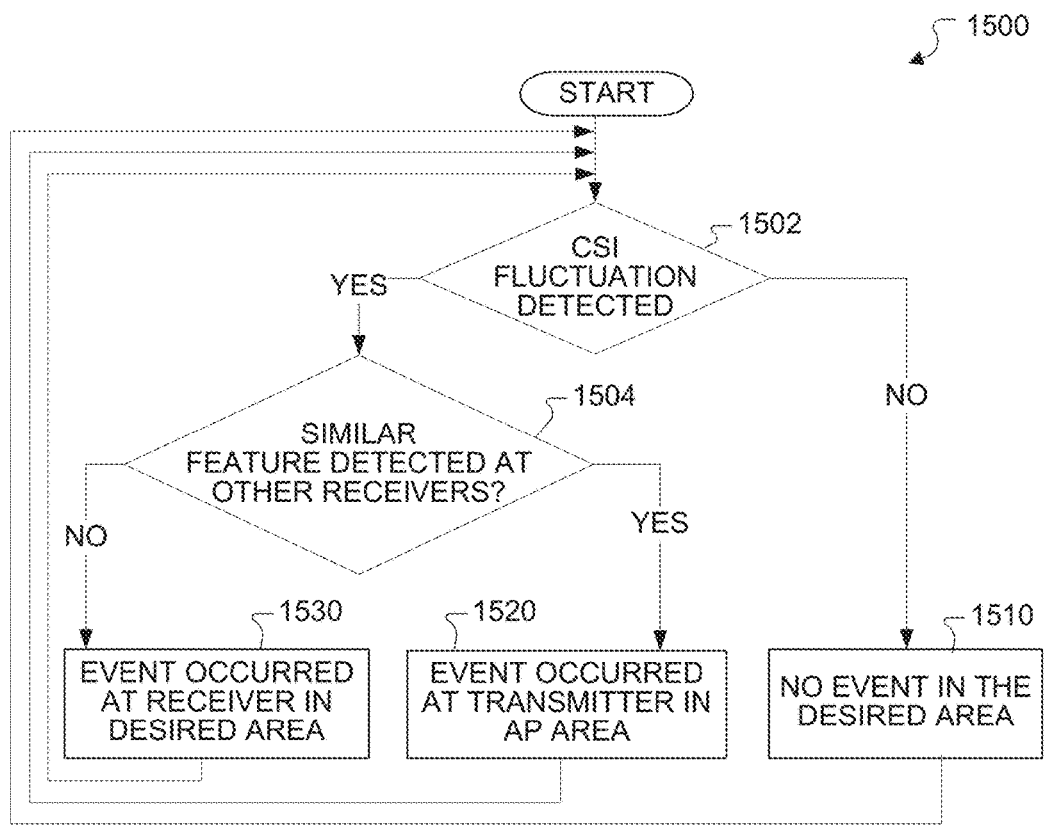
FIG. 15 illustrates an example method for occupancy detection utilizing a centralized system architecture in accordance with an embodiment of this disclosure.

FIG. 15 illustrates an example collaboration method 1500 for occupancy detection utilizing a centralized system architecture (for example, 1300 or 1400 of FIGS. 13 and 14) in accordance with an embodiment of this disclosure. The method 1500 resolves the ambiguity of motion at the transmitter side or at the receiver device side. The embodiment of the collaboration method 1500 shown in FIG. 15 is for illustration only, and other embodiments could be used without departing from the scope of this disclosure. The collaboration method 1500 includes a sensor fusion algorithm that is executed by the server 1302 or the master device 1402.

At the start of the method 1500, processed signals are received from the other devices. Particularly, the server 1302 receives the processed signals from the other devices (namely, Device #1, Device #2, through Device #N of FIG. 13). The master device 1402 or receives the processed signals from the other devices (namely, Device #2, Device #3, through Device #N of FIG. 14).

At block 1502, once a motion of an object is detected by one device, the method 1500 proceeds to block 1504. The one device that detected the motion of the object can be the transmitter (such as the AP 101) or can be a receiver (such as any of the STAs 111, 112a-112c). If no CSI fluctuation is detected at block 1502, then method 1500 proceeds to block 1510, where the server 1302 or master node 1402 determine that no event occurred in the desired area. An event can be a detected motion of an object (such as a human) or a detected vital sign.

At block 1504, the server 1302 or master node 1402 check if similar motion has been detected at the receiver side, namely by other devices or a selected subset of devices. In a case in which motion has been detected by the transmitter, the server 1302 or master node 1402 check if the motion detected by the transmitter is a similar motion as the motion detected by any of the receivers. In a case in which motion has not been detected by the transmitter, but instead has been detected my multiple receivers, the server 1302 or master node 1402 check if the motions detected by the receivers are similar to each other.

In one variation of block 1504, instead of directly checking the motion at the selected devices, a time window is used to select the detection results. For example, only motion detected at other selected devices within 1 seconds are counted as similar features.

If a similar feature has been detected at those other devices or the selected set of devices, then the method proceeds to block 1520, where the detected motion is categorized as motion located at AP 101 or transmitter side. For example, the detected motion is located within a threshold distance of the AP 101.

If there is no motion is detected at the selected subset devices, then the method 1500 proceeds to block 1530, where the detected motion will be categorized as an event that occurred at the receiver side in the desired area. If no motion is detected at the selected device, then there is no motion in the desired room (for example, within a threshold distance of the STA).

In another variation of this method 1500, the doppler frequency is calculated at the selected subset of devices. Once the difference of doppler frequency is within a predefined threshold region, these motions detected at other devices are categorized as the same motion. Once same or similar motion is detected at the other device, this motion will be categorized (at block 1520) as the motion at AP 101, which will not trigger the predefined action or predefined operation such as to turn on a smart lamp 306 or wakeup a smart television 308.

Figure 16:
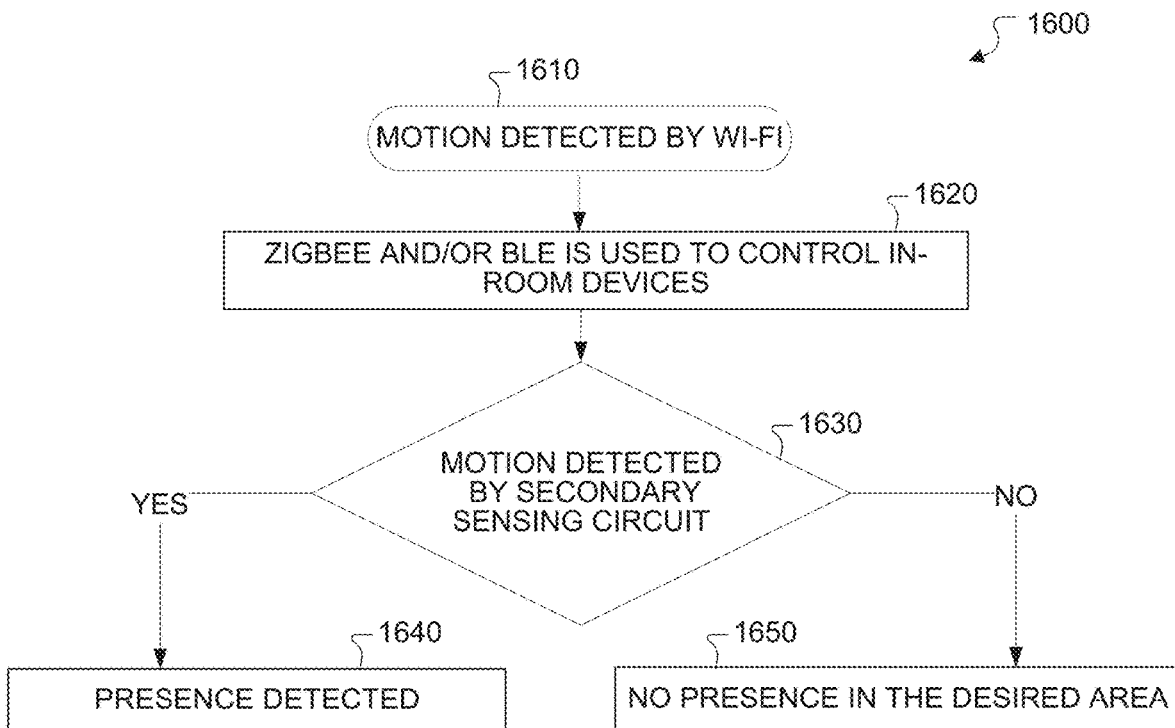
FIG. 16 illustrates an example method of occupancy detection utilizing a secondary sensing circuit in accordance with an embodiment of this disclosure.

FIG. 16 illustrates an example method 1600 of occupancy detection utilizing a secondary sensing circuit in accordance with an embodiment of this disclosure. The embodiment of the method 1600 shown in FIG. 16 is for illustration only, and other embodiments could be used without departing from the scope of this disclosure.

The method 1600 begins at block 1610, where motion of an object or a vital sign is detected by Wi-Fi sensing according to at least one occupancy detection method or algorithm described above in FIGS. 4 and 7-12.

The method 1600 is executed by a STA 111 that includes a room presence detection device, which includes both Wi-Fi communication circuitry and a secondary sensing circuit. The STA also includes speakers. The secondary sensing circuit can be one or more sensors of the STA 111, for example, microphones 220. The secondary sensing circuit can be an ultrasound module, in which case the room presence detection results will be based on both Wi-Fi signals and ultrasound signals. The secondary sensing circuit can be a Zigbee, BLE, Tread, or other RF device, in which case, the room presence detection results will be based on both Wi-Fi signals and the Zigbee, BLE, Tread, or other RF signals.

At block 1620, the STA determines that a Zigbee and/or BLE communication protocol is used to control in-room devices (for example, a smart television 308 or smart lamp 306). In certain embodiments of block 1620, once the motion is detected by Wi-Fi signals, the STA triggers an ultrasound module to perform motion detection.

At block 1630, the STA determines whether motion is detected by the secondary sensing circuit. At block 1640, in response to a determination that the secondary sensing circuit detected motion of an object within a second threshold distance of the STA, the room presence detection results indicate that the current occupancy state of the room is the occupied state. At block 1650, in response to a determination that the secondary sensing circuit detected no motion of an object within the second threshold distance of the STA, the room presence detection results indicate that the current occupancy state of the room is the empty state. The second threshold distance to the STA can be determined based on the secondary sensing circuit's sensitivity for detecting motion. The second threshold distance may be different from a first threshold distance, which may be determined based on the Wi-Fi circuitry's sensitivity for detecting motion.

In a particular example of the method 1600, once the ultrasound module also detects the motion, a presence of an object in the room is detected, but otherwise, there is no presence detected.

In one embodiment of the method 1600, once the motion is detected by Wi-Fi signal, an ultrasound motion detection module is triggered. The ultrasound motion detection results and Wi-Fi motion detection result will be combined together by a function, then the combination is compared (at block 1630) to a predefined threshold. The result of the comparison determines whether presence is detected or not. The function for combining could be a weighted sum function in which the weights are preselected.

In one example of the embodiment wherein both Wi-Fi and Zigbee/BLE/Thread signals are used for motion detection, a user input indicates whether the user device (for example, STA 111) is connected to control other Zigbee/BLE/Thread devices which are in the same room of this device. When there is one of these devices in the room with the user device, once a motion is detected by Wi-Fi, the device will further check if there is motion detected by Zigbee/BLE/Thread. If a motion is detected by these secondary Zigbee/BLE/Thread sensors, a presence will be reported to be detected otherwise there is no presence be detected. A fusion function can be used to combine the detection results from Wi-Fi and BLE/Zigbee/Thread together. One example of this fusion function is the weighted sum function.

Figure 17:
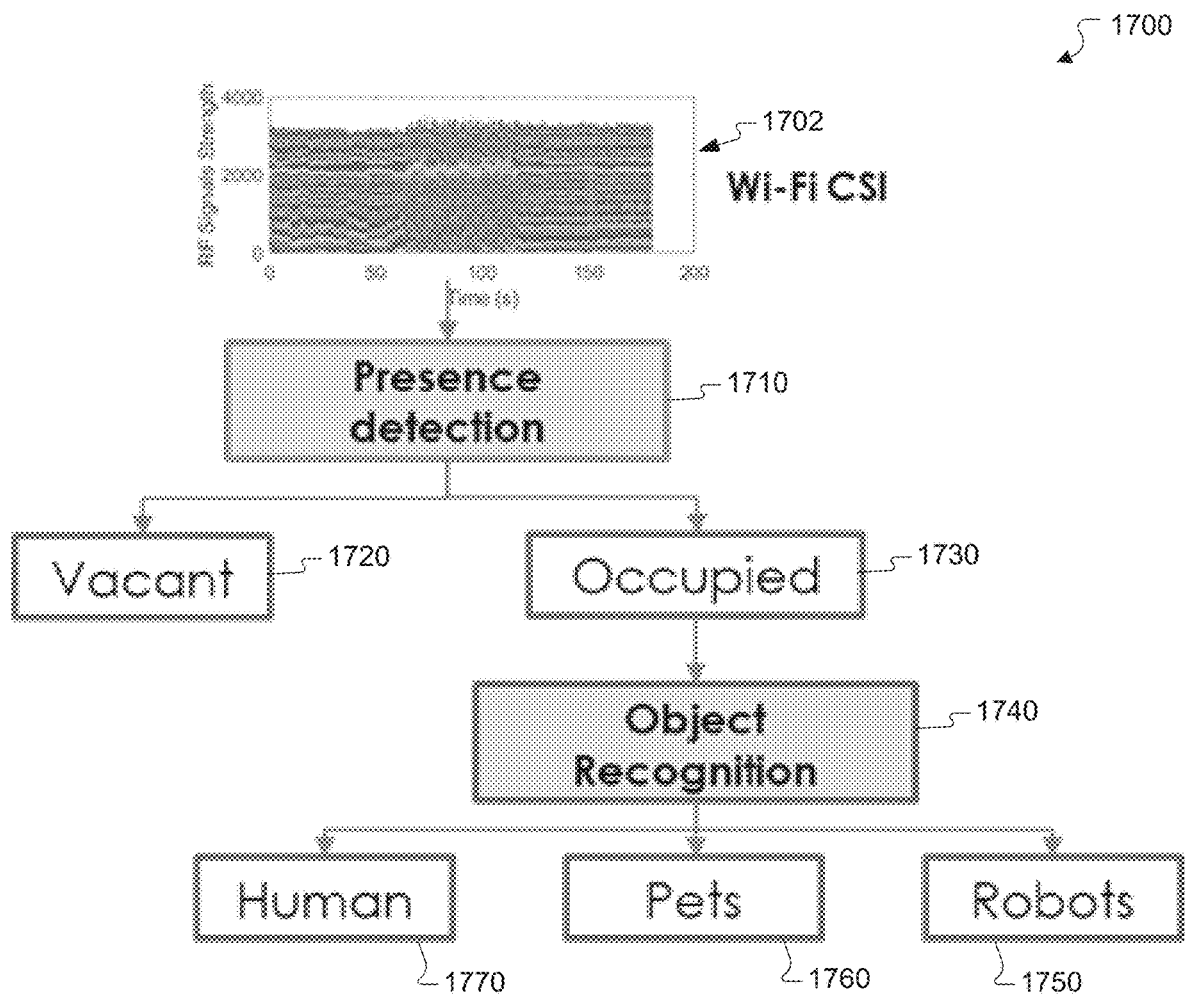
FIG. 17 illustrates an example method of object recognition-based occupancy detection in accordance with an embodiment of this disclosure.

FIG. 17 illustrates an example method 1700 of object recognition-based occupancy detection in accordance with an embodiment of this disclosure. The embodiment of the method 1700 shown in FIG. 17 is for illustration only, and other embodiments could be used without departing from the scope of this disclosure.

Wi-Fi CSI data 1702 is received by the STA 111. The Wi-Fi CSI data 1702 includes a graph of RF signal strength versus time and in which each subcarrier is represented by a curve, where each curve displayed in a different color. Each curve includes CSI fluctuations between 50 and 120 seconds, which indicates a disturbance event occurred during that period of time.

At block 1710, received Wi-Fi CSI data 1702 is processed to determine whether motion of an object or a vital sign is detected by Wi-Fi sensing according to at least one occupancy detection method or algorithm described above in FIG. 4, 7-12, or 15-16. At block 1720 and 1730, a result of the occupancy detection method or algorithm is output. Particularly, at block 1720, the occupancy detection method or algorithm outputs a first indicator indicating that the room is in an empty state (illustrated as "Vacant"). At block 1730, the occupancy detection method or algorithm outputs a second indicator indicating that the room is in an occupied state.

At block 1740, after detecting the room occupied, the CSI signal is further processes to recognize if the room is occupied by a dog, a moving robot or a human. Particularly, the CSI data 1702 is input to an object recognition function. The object recognition function will output a robot indicator 1750 if the object is moving robot, a pet indicator 1760 if the object is a dog, or a human indicator 1770 if the object is a human. Once a non-human object is detected, predefined operation such as to turn on a smart lamp 306 or wakeup a smart television 308 will not be activated.

Figure 18:
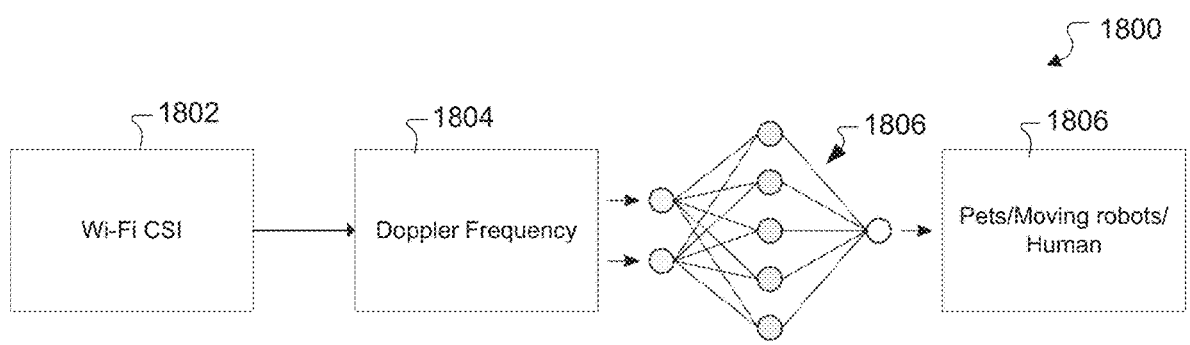
FIG. 18 illustrates a block diagram of moving object detection in accordance with an embodiment of this disclosure.

FIG. 18 illustrates a block diagram of moving object detection algorithm 1800 in accordance with an embodiment of this disclosure. The embodiment of the detection algorithm 1800 shown in FIG. 18 is for illustration only, and other embodiments could be used without departing from the scope of this disclosure. The detection algorithm 1800 can be implemented by an object recognition module as shown in FIG. 18. Particularly, block 1802 includes receiving Wi-Fi CSI data, such as the Wi-Fi CSI data 1702 of FIG. 17. At block 1804, a Doppler speed over time two-dimension feature is calculated based on the received Wi-Fi CSI data 1702. A neural network 1806 is used to distinguish if the detected motion is a dog, a moving robot, or a human. At block 1808, an output of the neural network 1806 indicates whether the detected motion is a dog, a moving robot, or a human.

Figure 19A:
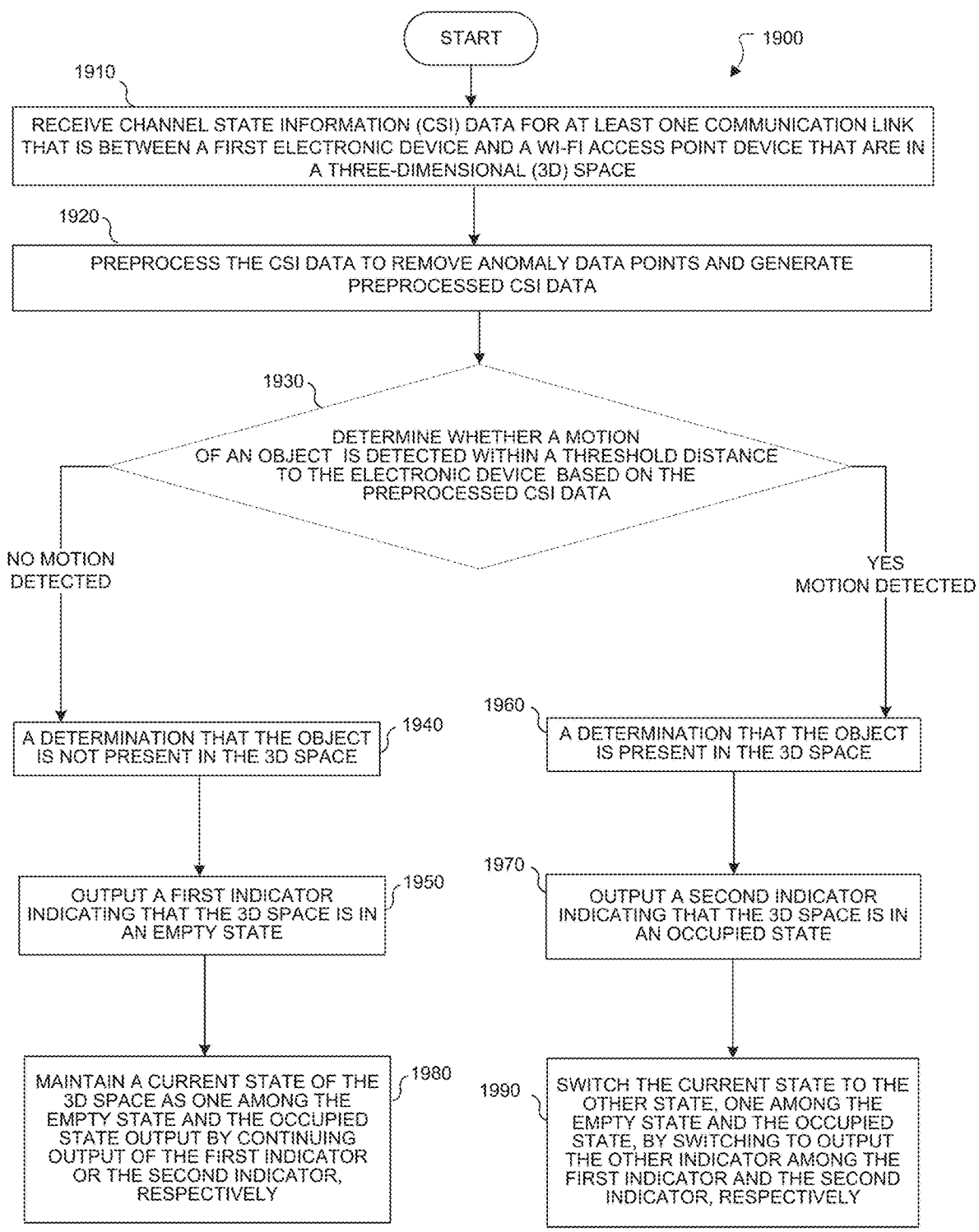
FIGS. 19A-19C illustrate a process for presence/occupancy detection and object recognition in accordance with various embodiments of this disclosure.
Figure 19B:
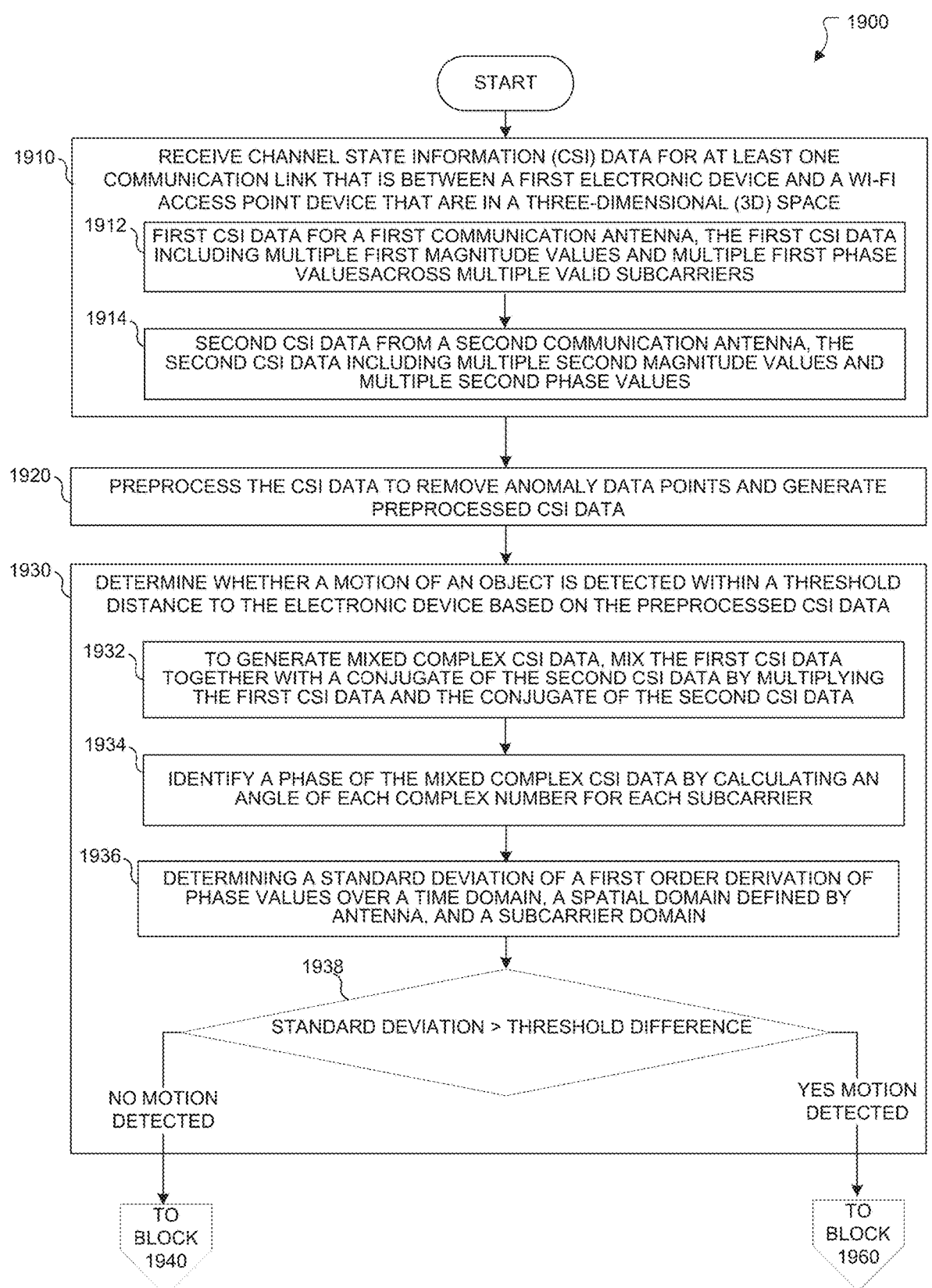
Figure 19C:
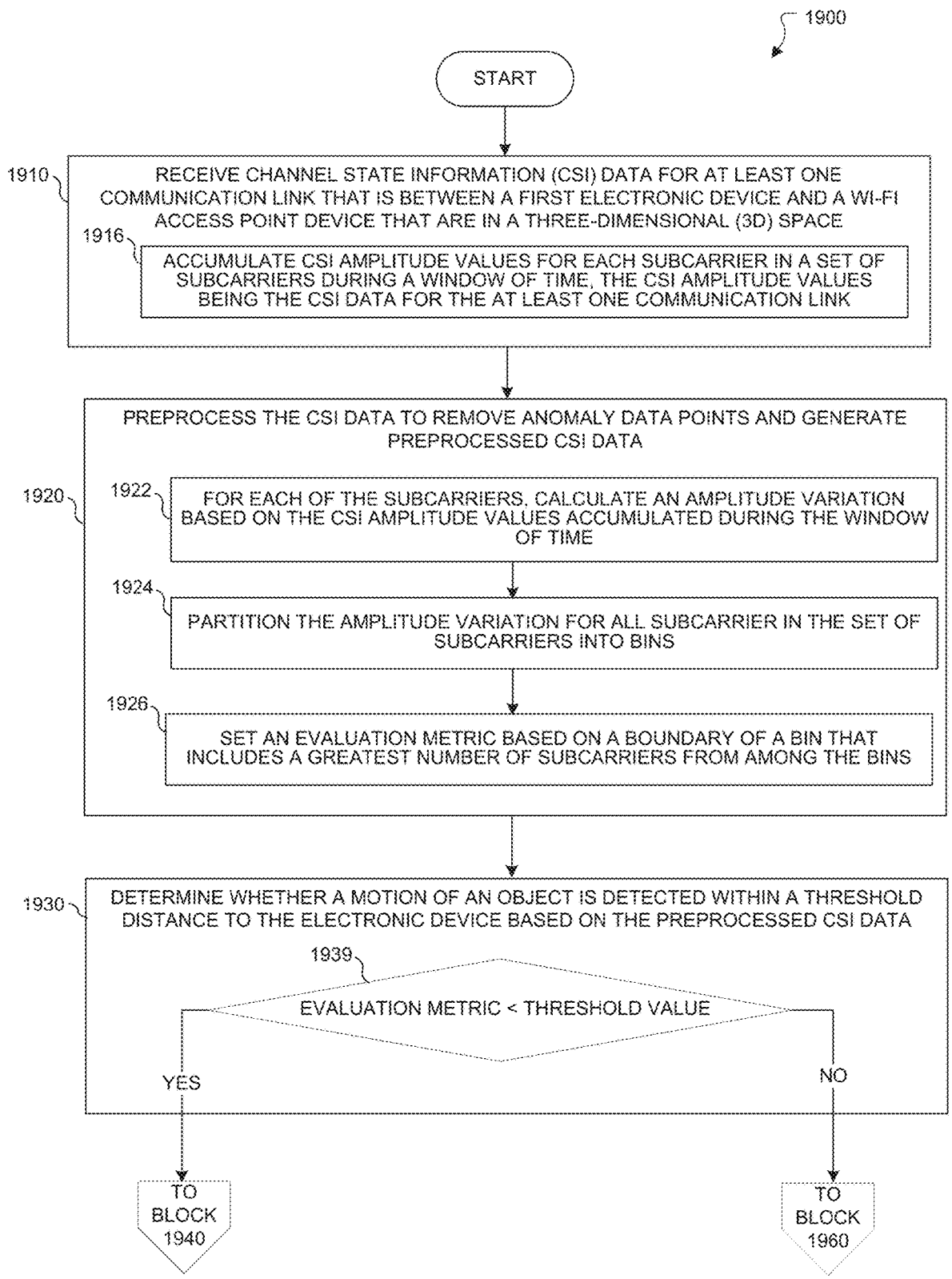

FIGS. 19A-19C illustrate a method 1900 for presence/occupancy detection and object recognition in accordance with various embodiments of this disclosure. The embodiment of the method 1900 shown in FIG. 19 is for illustration only, and other embodiments could be used without departing from the scope of this disclosure. The method 1900 is implemented by an electronic device, such as the STA 111 of FIG. 2B. More particularly, the method 1900 could be performed by a processor 240 of the STA 111 executing the applications 262, which enable the STA to perform any of the occupancy detection methods or algorithms described above in FIGS. 4, 7-12, and 15-18. For ease of explanation, the method 1900 is described as being performed by the processor 240.

At block 1910, the processor 240 receives CSI data for at least one communication link that is between a first electronic device and a Wi-Fi access point device that are in a 3D space. To avoid duplication of description, the 3D space is located with a threshold distance of the STA, and, in this this disclosure, is generally referred to a desired area or room where the STA is located.

At block 1920, the processor 240 preprocesses the received CSI data to remove one or more anomaly data points and generate preprocessed CSI data. At block 1930, the processor 240 determines whether a motion of an object is detected within a threshold distance to the STA 111 based on the preprocessed CSI data.

At block 1940, in response to a detection of no motion of the object, the processor 240 determines that the object is not present in the 3D space. At block 1950, the processor 240 outputs a first indicator indicating that the 3D space is in an empty state.

At block 1960, the processor 240 determines that the object is present in the 3D space. At block 1970, the processor 240 outputs a second indicator indicating that the 3D space is in an occupied state.

At block 1980, the processor 240 maintains a current state of the 3D space as one among the empty state and the occupied state output by continuing output of the first indicator or the second indicator, respectively. For example, if the current occupancy state is the occupied state, then the processor maintains the occupied state and does not change to another state.

At block 1990, the processor 240 switches the current state to the other state, one among the empty state and the occupied state, by switching to output the other indicator among the first indicator and the second indicator, respectively.

FIG. 19B shows a first variation of the method 1900. Particularly, block 1910 includes blocks 1912 and 1914, and block 1930 includes blocks 1932, 1934, 1936, and 1930.

Block 1912 shows that the CSI information received at block 1910 includes first CSI data for a first communication antenna. The first CSI data includes multiple first magnitude values and multiple first phase values across multiple valid subcarriers. Block 1914 shows that the CSI information received at block 1910 includes second CSI data from a second communication antenna. The second CSI data includes multiple second magnitude values and multiple second phase values.

At block 1932, to generate mixed complex CSI data, the processor 240 mixes the first CSI data together with a conjugate of the second CSI data by multiplying the first CSI data and the conjugate of the second CSI data. At block 1934, the processor 240 identifies a phase of the mixed complex CSI data by calculating an angle of each complex number for each subcarrier. At block 1936, the processor 240 determines a standard deviation of a first order derivation of phase values over a time domain, a spatial domain defined by antenna, and a subcarrier domain. At block 1938, the processor 240 determines whether the standard deviation is greater than a threshold difference (for example, the threshold motion value 734 of FIG. 7). If the standard deviation 730 is not greater than the threshold difference, then NO motion is detected, and the method 1900 proceeds to block 1940. Otherwise, if the standard deviation is greater than the threshold difference, then YES, motion is detected, and the method proceeds to block 1960.

FIG. 19C shows a second variation of the method 1900. Particularly, block 1910 includes blocks 1916. Block 1920 includes blocks 1922, 1924, 1926. Block 1930 includes block 1939.

At block 1916, to receive CSI data, the processor 240 accumulates CSI amplitude values for each subcarrier in a set of subcarriers during a window of time. The CSI amplitude values are the CSI data for the at least one communication link.

To preprocess the CSI data, at block 1922, for each of the subcarriers, the processor 240 calculates an amplitude variation based on the CSI amplitude values accumulated during the window of time. At block 1924, the processor 240 partitions the amplitude variation for all subcarrier in the set of subcarriers into bins. At block 1926, the processor 240 sets an evaluation metric based on a boundary of a bin that includes the greatest number of subcarriers from among the bins.

To determine whether a motion of an object is detected within a threshold distance to the STA 111, at block 1939, if the processor 240 determines an evaluation metric $csi_{metric}$ is less than a predefined threshold $csi_{thresh}$, the method 1900 proceeds to block 1940. Otherwise, if the processor 240 determines an evaluation metric $csi_{metric}$ is not less than a predefined threshold $csi_{thresh}$, the method 1900 proceeds to block 1960. The procedure at block 1939 is similar to the procedure at block 940 of FIG. 9.

Although FIGS. 19A-19C illustrates an example method 1900 for presence/occupancy detection and object recognition, various changes may be made to FIGS. 19A-19C. For example, while shown as a series of steps, various steps in FIGS. 19A-19C could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of a first electronic device, the method comprising:
   receiving channel state information (CSI) data for at least one communication link between the first electronic device and a Wi-Fi device in a three-dimensional (3D) space, wherein the CSI data for at least one communication link includes multiple CSI amplitude values across multiple valid subcarriers from among a set of subcarriers, for each among at least one communication antenna of the first electronic device;
   preprocessing the CSI data to remove one or more anomaly data points and generate preprocessed CSI data;
   determining whether a motion of an object is detected within a threshold distance to the first electronic device based on the preprocessed CSI data, a detection of the motion of the object corresponding to a determination that the object is present in the 3D space, a detection of no motion of the object corresponding to a determination that the object is not present in the 3D space; and
   outputting at least one of:
      a first indicator indicating that the 3D space is in an empty state, in response to the determination that the object is not present in the 3D space; or
      a second indicator indicating that the 3D space is in an occupied state, in response to the determination that the object is present in the 3D space.

2. The method of claim 1, wherein:
   receiving the CSI data for at least one communication link includes:
      receiving first CSI data for a first communication antenna, the first CSI data including multiple first amplitude values and multiple first phase values across the multiple valid subcarriers; and
      receiving second CSI data from a second communication antenna, the second CSI data including multiple second amplitude values and multiple second phase values across the multiple valid subcarriers; and
   determining whether the motion of the object is detected within the threshold distance to the first electronic device comprises:
      to generate mixed complex CSI data, mixing the first CSI data together with a conjugate of the second CSI data by multiplying the first CSI data and the conjugate of the second CSI data;
      identifying a phase of the mixed complex CSI data by calculating an angle of each complex number for each subcarrier;
      determining a standard deviation of a first order derivation of phase values over a time domain, a spatial domain defined by antenna, and a subcarrier domain;
      detecting the motion of the object based on a determination that the standard deviation is greater than a threshold difference that indicates motion of the object; and
      detecting no motion of the object based on a determination that the standard deviation is not greater than the threshold difference.

3. The method of claim 1, further comprising:
   in response to the detection of no motion of the object, maintaining a current state of the 3D space as one among the empty state and the occupied state by continuing output of the first indicator or the second indicator, respectively; and
   in response to the detection of the motion of the object, switching the current state to the other state, one among the empty state and the occupied state, by switching to output the other indicator among the first indicator and the second indicator, respectively,
   wherein the first electronic device is configured to access the Wi-Fi device to access to an inter-network.

4. The method of claim 3, further comprising:
   accumulating CSI amplitude values for each subcarrier in the set of subcarriers during a window of time, the CSI amplitude values being the CSI data;
   determining whether a vital sign of the object is detected in the 3D space based on a decision tree-based classification of:
      a normalized standard deviation of CSI amplitude values for each subcarrier in the set of subcarriers during a window of time;
      a respiration energy ratio (RER);
      a frequency of the RER; and
      a standard deviation of a respiration rate;
   post processing a set of determination results indicating that the vital sign of the object is detected or not detected, the determination results corresponding to the CSI amplitude values in the window of time, respectively;
   identifying that the vital sign of the object is detected, in response to a determination that a majority among the set of determination results indicate that the vital sign of the object is detected; and identifying that the vital sign of the object is not detected, in response to a determination that a majority among the set of determination results indicate that the vital sign of the object is not detected.

5. The method of claim 1, further comprising:
accumulating a CSI amplitude values for each subcarrier in the set of subcarriers during a window of time, the CSI amplitude values being the CSI data,
wherein preprocessing the CSI data includes:
   for each of the subcarriers, calculating an amplitude variation based on the CSI amplitude values accumulated during the window of time;
   partitioning the amplitude variation for all subcarrier in the set of subcarriers into bins; and
   setting an evaluation metric based on a boundary of a bin that includes a greatest number of subcarriers from among the bins; and
determining whether a motion of an object is detected within a threshold distance to the first electronic device by:
   detecting no motion of the object based on a determination that the evaluation metric is less than a threshold value; and
   detecting the motion of the object based on a determination that the evaluation metric is not less than the threshold value.

6. The method of claim 1, further comprising:
establishing a connection to a master device, the master device configured to generate group-level determination based on a collection of presence detection data that the master device receives from a plurality of electronic devices in the 3D space including the first electronic device;
transmitting, to the master device, presence detection data to be added to the collection of presence detection data, the presence detection data including one of the first indicator, the second indicator, and the CSI data; and
in response to the transmitted presence detection data being added to the collection of presence detection data, receiving, from the master device, the group-level determination that is one of:
   a determination that the object is not present within the threshold distance to the first electronic device;
   a determination that the object is present within the threshold distance to the first electronic device; and
   a determination that the object is present within the threshold distance to the master device.

7. The method of claim 1, further comprising:
in response to detecting motion of the object within the threshold distance to the first electronic device, determining whether motion of the object is detected within a second threshold distance to the first electronic device based on ultrasound radar signals, Zigbee CSI signals, or BLE CSI signals received from a secondary sensing circuit of the first electronic device, the secondary sensing circuit including at least one of an ultrasound radar, a Zigbee communication circuit, or a Bluetooth low energy (BLE) communication circuit; and
determining that the object is within a desired area based on the detections of the motion of the object within the first and second threshold distances.

8. A first electronic device comprising:
a wireless communication circuit configured to operate using a Wi-Fi protocol and including at least one communication antenna;
a processor operably connected to the wireless communication circuit and configured to:
receive channel state information (CSI) data for at least one communication link between the first electronic device and a Wi-Fi device in a three-dimensional (3D) space, wherein the CSI data for at least one communication link includes multiple CSI amplitude values across multiple valid subcarriers from among a set of subcarriers, for each among the at least one communication antenna;
   preprocess the CSI data to remove one or more anomaly data points and generate preprocessed CSI data;
   determine whether a motion of an object is detected within a threshold distance to the first electronic device based on the preprocessed CSI data, a detection of the motion of the object corresponding to a determination that the object is present in the 3D space, a detection of no motion of the object corresponding to a determination that the object is not present in the 3D space; and
   output at least one of:
      a first indicator indicating that the 3D space is in an empty state, in response to the determination that the object is not present in the 3D space; or
      a second indicator indicating that the 3D space is in an occupied state, in response to the determination that the object is present in the 3D space.

9. The first electronic device of claim 8, wherein the processor is further configured to:
receive the CSI data for at least one communication link by:
   receiving first CSI data for a first communication antenna, the first CSI data including multiple first amplitude values and multiple first phase values across the multiple valid subcarriers; and
   receiving second CSI data from a second communication antenna, the second CSI data including multiple second amplitude values and multiple second phase values across the multiple valid subcarriers;
determine whether the motion of the object is detected within the threshold distance to the first electronic device by:
   to generate mixed complex CSI data, mixing the first CSI data together with a conjugate of the second CSI data by multiplying the first CSI data and the conjugate of the second CSI data;
   identifying a phase of the mixed complex CSI data by calculating an angle of each complex number for each subcarrier;
   determining a standard deviation of a first order derivation of phase values over a time domain, a spatial domain defined by antenna, and a subcarrier domain;
   detecting the motion of the object based on a determination that the standard deviation is greater than a threshold difference that indicates motion of the object; and
   detecting no motion of the object based on a determination that the standard deviation is not greater than the threshold difference.

10. The first electronic device of claim 8, wherein the processor is further configured to:
in response to detecting no motion of the object, maintain a current state of the 3D space as one among the empty state and the occupied state output by continuing output of the first indicator or the second indicator, respectively; and in response to detecting the motion of the object, switch the current state to the other state one among the empty state and the occupied state by switching to output the other indicator among the first indicator and the second indicator, respectively.

11. The first electronic device of claim 8, wherein the processor is further configured to:
accumulate CSI amplitude values for each subcarrier in the set of subcarriers during a window of time, the CSI amplitude values being the CSI data for the at least one communication link;
preprocess the CSI data by:
for each of the subcarriers, calculate an amplitude variation based on the CSI amplitude values accumulated during the window of time;
partition the amplitude variation for all subcarrier in the set of subcarriers into bins; and
set an evaluation metric based on a boundary of a bin that includes a greatest number of subcarriers from among the bins; and
detect no motion of the object based on a determination that the evaluation metric is less than a threshold value; and
detect the motion of the object based on a determination that the evaluation metric is not less than the threshold value.

12. The first electronic device of claim 11, wherein the processor is further configured to:
determine whether a vital sign of the object is detected in the 3D space based on a decision tree-based classification of:
a normalized standard deviation of the CSI amplitude values for each subcarrier in the set of subcarriers during the window of time;
a respiration energy ratio (RER);
a frequency of the RER; and
a standard deviation of a respiration rate;
post process a set of determination results indicating that the vital sign of the object is detected or not detected, the determination results corresponding to the CSI amplitude values in the window of time, respectively;
identify that the vital sign of the object is detected, in response to a determination that a majority among the set of determination results indicate that the vital sign of the object is detected; and
identify that the vital sign of the object is not detected, in response to a determination that a majority among the set of determination results indicate that the vital sign of the object is not detected.

13. The first electronic device of claim 8, wherein the processor is further configured to:
establish a connection to a master device, the master device configured to generate group-level determination based on a collection of presence detection data that the master device receives from a plurality of electronic devices in the 3D space including the first electronic device;
transmit, to the master device, presence detection data to be added to the collection of presence detection data, the presence detection data including one of the first indicator, the second indicator, and the CSI data for the at least one communication link, as;
in response to the transmitted presence detection data being added to the collection of presence detection data, receiving, from the master device, the group-level determination that is one of:

a determination that the object is not present within the threshold distance to the first electronic device;
a determination that the object is present within the threshold distance to the first electronic device; and
a determination that the object is present within the threshold distance to the master device.

14. The first electronic device of claim 8, further comprising:
a secondary sensing circuit that includes as least one of an ultrasound radar, a Zigbee communication circuit, or a Bluetooth low energy (BLE) communication circuit,
wherein the processor is further configured to:
in response to detecting motion of the object within the threshold distance to the first electronic device, determine whether motion of the object is detected within a second threshold distance to the first electronic device based on ultrasound radar signals, Zigbee CSI signals, or BLE CSI signals received from the secondary sensing circuit; and
determine that the object is within a desired area based on the detections of the motion of the object within the first and second threshold distances.

15. A non-transitory computer readable medium embodying a computer program, the computer program comprising computer readable program code that, when executed by a processor of a first electronic device, causes the first electronic device to:
receive channel state information (CSI) data for at least one communication link between the first electronic device and a Wi-Fi device in a three-dimensional (3D) space, wherein the CSI data for at least one communication link includes multiple CSI amplitude values across multiple valid subcarriers from among a set of subcarriers, for each among at least one communication antenna of the first electronic device;
preprocess the CSI data to remove one or more anomaly data points and generate preprocessed CSI data;
determine whether a motion of an object is detected within a threshold distance to the first electronic device based on the preprocessed CSI data, a detection of the motion of the object corresponding to a determination that the object is present in the 3D space, a detection of no motion of the object corresponding to a determination that the object is not present in the 3D space; and
output at least one of:
a first indicator indicating that the 3D space is in an empty state, in response to the determination that the object is not present in the 3D space; or
a second indicator indicating that the 3D space is in an occupied state, in response to the determination that the object is present in the 3D space.

16. The non-transitory computer readable medium of claim 15, wherein:
the program code that when executed cause the first electronic device to receive the CSI data for at least one communication link further comprises instructions that when executed cause the first electronic device to:
receive first CSI data for a first communication antenna, the first CSI data including multiple first amplitude values and multiple first phase values across the multiple valid subcarriers; and
receive second CSI data from a second communication antenna, the second CSI data including multiple second amplitude values and multiple second phase values across the multiple valid subcarriers;
the instructions that when executed cause the first electronic device to determine whether the motion of the object is detected within the threshold distance to the first electronic device further comprise instructions that when executed cause the first electronic device to:
  to generate mixed complex CSI data, mix the first CSI data together with a conjugate of the second CSI data by multiplying the first CSI data and the conjugate of the second CSI data;
  identify a phase of the mixed complex CSI data by calculating an angle of each complex number for each subcarrier;
  determine a standard deviation of a first order derivation of phase values over a time domain, a spatial domain defined by antenna, and a subcarrier domain;
  detect the motion of the object based on a determination that the standard deviation is greater than a threshold difference that indicates motion of the object; and
  detect no motion of the object based on a determination that the standard deviation is not greater than the threshold difference.

17. The non-transitory computer readable medium of claim 15, further comprising program code that when executed cause the first electronic device to:
  in response to detecting no motion of the object, maintain a current state of the 3D space as one among the empty state and the occupied state output by continuing output of the first indicator or the second indicator, respectively; and
  in response to detecting the motion of the object, switch the current state to the other state one among the empty state and the occupied state by switching to output the other indicator among the first indicator and the second indicator, respectively.

18. The non-transitory computer readable medium of claim 15, further comprising program code that when executed cause the first electronic device to:
  accumulate a CSI amplitude values for each subcarrier in the set of subcarriers during a window of time, the CSI amplitude values being the CSI data for the at least one communication link,
  wherein the program code that when executed cause the processor to preprocess the CSI data further comprise instructions that when executed cause the processor to:
    for each of the subcarriers, calculate an amplitude variation based on the CSI amplitude values accumulated during the window of time;
    partition the amplitude variation for all subcarrier in the set of subcarriers into bins; and
    set an evaluation metric based on a boundary of a bin that includes a greatest number of subcarriers from among the bins; and
    detect no motion of the object based on a determination that the evaluation metric is less than a threshold value; and
    detect the motion of the object based on a determination that the evaluation metric is not less than the threshold value; and
  wherein the non-transitory computer readable medium further contains instructions that when executed cause the processor to:
    detect no motion of the object based on a determination that the evaluation metric is less than a threshold value; and
    detect the motion of the object based on a determination that the evaluation metric is not less than the threshold value.

19. The non-transitory computer readable medium of claim 15, further comprising program code that when executed cause the first electronic device to:
  establish a connection to a master device, the master device configured to generate group-level determination based on a collection of presence detection data that the master device receives from a plurality of electronic devices in the 3D space including the first electronic device;
  transmit, to the master device, presence detection data to be added to the collection of presence detection data, the presence detection data including one of the first indicator, the second indicator, and the CSI data for the at least one communication link, as;
  in response to the transmitted presence detection data being added to the collection of presence detection data, receiving, from the master device, the group-level determination that is one of:
    a determination that the object is not present within the threshold distance to the first electronic device;
    a determination that the object is present within the threshold distance to the first electronic device; and
    a determination that the object is present within the threshold distance to the master device.

20. The non-transitory computer readable medium of claim 15, further comprising program code that when executed cause the first electronic device to:
  in response to detecting motion of the object within the threshold distance to the first electronic device, determine whether motion of the object is detected within a second threshold distance to the first electronic device based on ultrasound radar signals, Zigbee CSI signals, or BLE CSI signals received from a secondary sensing circuit; and
  determine that the object is within a desired area based on the detections of the motion of the object within the first and second threshold distances.

* * * * *